(12) United States Patent
Cuche et al.

(10) Patent No.: US 6,262,818 B1
(45) Date of Patent: Jul. 17, 2001

(54) METHOD FOR SIMULTANEOUS AMPLITUDE AND QUANTITATIVE PHASE CONTRAST IMAGING BY NUMERICAL RECONSTRUCTION OF DIGITAL HOLOGRAMS

(75) Inventors: Etienne Cuche; Christian Depeursinge, both of Lausanne (CH)

(73) Assignee: Institute of Applied Optics, Swiss Federal Institute of Technology, Lausanne (CH)

( * ) Notice: Subject to any disclaimer, the term of this patent is extended or adjusted under 35 U.S.C. 154(b) by 0 days.

(21) Appl. No.: 09/265,364

(22) Filed: Mar. 10, 1999

Related U.S. Application Data

(60) Provisional application No. 60/103,557, filed on Oct. 7, 1998.

(51) Int. Cl.[7] .............................. G03H 1/02; G03H 1/10; G03H 1/12; G03H 1/22; G06K 9/76
(52) U.S. Cl. .................. 359/9; 359/10; 359/11; 359/29; 359/32; 382/210; 382/254
(58) Field of Search ................................ 359/9, 29, 10, 359/11, 32; 382/210, 254

(56) References Cited

U.S. PATENT DOCUMENTS 5,214,581 * 5/1993 Rhodes et al. .

* cited by examiner

*Primary Examiner*—Audrey Chang
(74) *Attorney, Agent, or Firm*—Oblon, Spivak, McClelland, Maier & Neustadt, P.C.

(57) ABSTRACT

A method for the numerical reconstruction of digital holograms which allows simultaneously amplitude and quantitative phase contrast imaging. The reconstruction method computes the propagation of the field that would be diffracted by the hologram during a standard hologram reconstruction. The method requires the adjustment of several reconstruction parameters for the definition of a digital replica of the reference wave. When the set-up used for the hologram creation produces phase aberrations, the method includes a digital method for the correction of the phase aberrations. The phase contrast image is quantitative, meaning that the reconstructed phase distribution can be used for quantitative measurements. The method can be used to reconstruct a set of holograms taken in different conditions. The method can be used to reconstruct several images from a single hologram taken with more than one reference waves and/or more than one object waves.

73 Claims, 14 Drawing Sheets

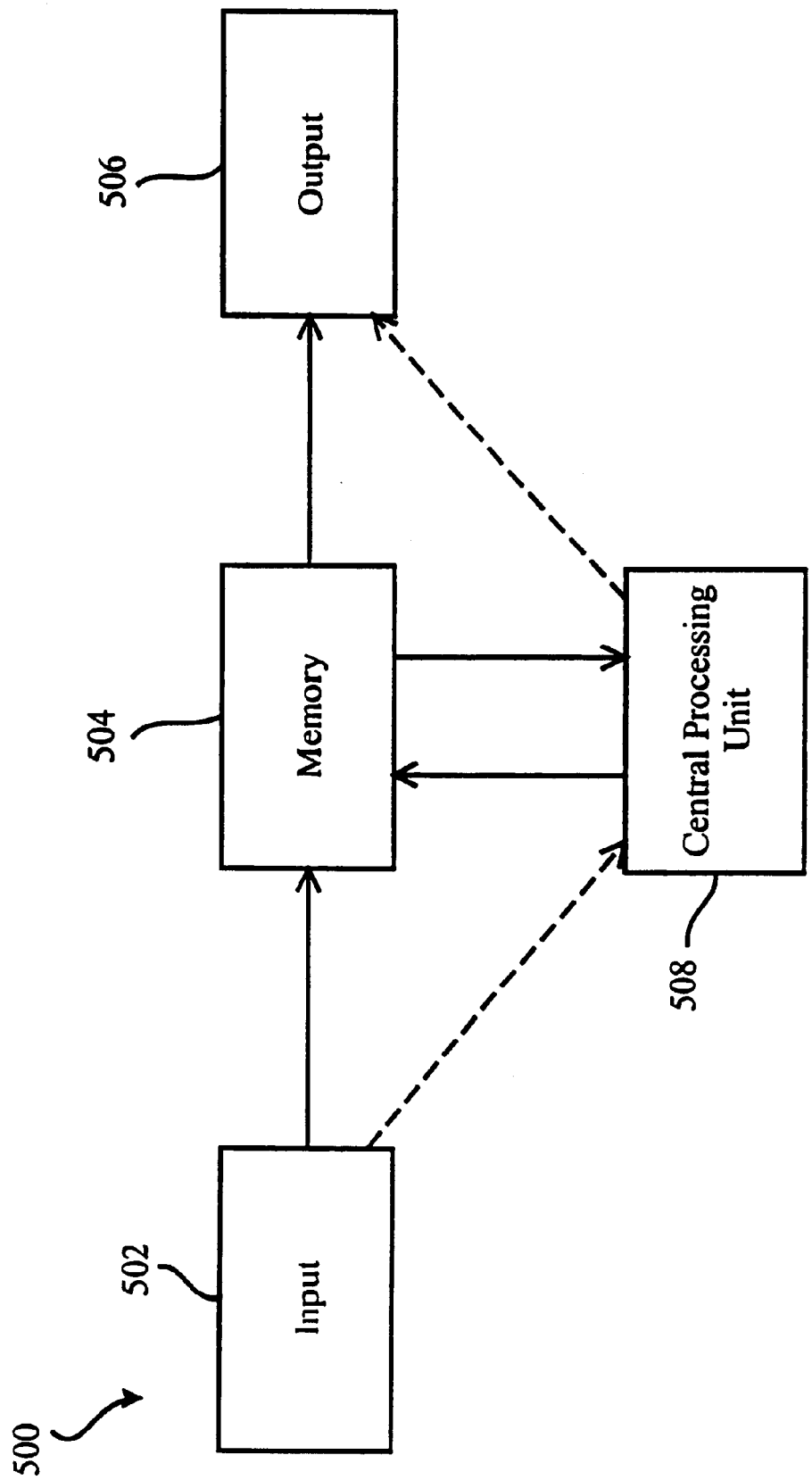

METHOD FOR SIMULTANEOUS AMPLITUDE AND QUANTITATIVE PHASE CONTRAST IMAGING BY NUMERICAL RECONSTRUCTION OF DIGITAL HOLOGRAMS

This application claims benefit of provisional application 60/103,557 filed Oct. 7, 1998.

BACKGROUND OF THE INVENTION

1. Field of the Invention

The present invention relates to a method for simultaneous amplitude and quantitative phase contrast imaging by numerical reconstruction of digitally encoded holograms.

2. Discussion of the Background

The idea of recording a hologram of the specimen and reconstructing the hologram with a numerical method has been reported for the first time in 1967 by J. W. Goodman and R. W. Laurence, "Digital image formation from electronically detected holograms," Appl. Phys. Lett. 11, 77–79 (1967). who used a vidicon detector for the hologram recording, and in 1971 by M. A. Kronrod et al., "Reconstruction of a hologram with a computer," Soviet Phys.— Technical Phys. 17, 333–334 (1972) who used a digitized image of a hologram recorded on a photographic plate. In these two references, the holograms were recorded in the holographic Fourier configuration for which amplitude contrast images of the specimen can be numerically reconstructed by simply calculating the modulus of the two-dimensional Fourier transform of the hologram. A recent development using a Charged Coupled Device (CCD) camera as recording device, also in the Fourier configuration, has been patented (U.S. Pat. No. 4,955,974 and U.S. Pat. No. 5,214,581) and reported by W. S. Haddad et al., "Fourier-transform holographic microscope," Applied Optics 31, 4973–4978 (1992)., and by K. Boyer et al., "Biomedical three-dimensional holographic microimaging at visible, ultraviolet and X-ray wavelength," Nature Medicine 2, 939–941 (1996)., for X-ray amplitude contrast imaging of biological specimens.

In 1994, on the basis of precedent works about digital holography, L. P. Yaroslavskii and N. S. Merzlyakov, Methods of Digital Holography, (Consultants Bureau. New York, 1980)., Schnars et al., "Direct recording of holograms by a CCD target and numerical reconstruction," Applied Optics 33, 179–181 (1994). have reported the first numerically reconstructed amplitude contrast image from an off-axis hologram recorded in the Fresnel holographic configuration with a CCD camera. With the same reconstruction algorithm but with a low-coherence light source, E. Cuche et al., "Optical Tomography at the Microscopic scale by means of a Numerical Low Coherence Holographic Technique," Proceedings SPIE on Optical and Imaging techniques for Bioimaging, Vienna, Vol. 2927, 61–66 (1996) have reported an application of numerical holography for tomographic imaging. An application in micro-endoscopy, using also a Fresnel calculation for the hologram reconstruction, has been reported by O. Coquoz et al., "Performances of endoscopic holography with a multicore optical fiber," Applied Optics 34, 7186–7193 (1995).

All the above mentioned works concern amplitude contrast imaging for which only the modulus of the numerically reconstructed optical field is considered. The first use of a numerically reconstructed phase distribution, from a Fresnel hologram, has been reported by Schnars et al., "Direct phase determination in hologram interferometry with use of digitally recorded holograms," J.Opt.Soc.Am.A 11, 2011–2015 (1994). for an application in holographic interferometry. As presented in Ref. Schnars et al., the used reconstruction algorithm is the same as for amplitude contrast imaging and do not really allows phase contrast imaging, because, in this case, the reconstructed optical field is the product of the object wave by the complex conjugate of the reference wave (or the product of the complex conjugate of the object wave by the reference wave). However, this reconstruction algorithm can be used in holographic interferometry, because the subtraction between two reconstructed phase distributions obtained with the same reference wave provides an image which represents only the phase difference between the deformed and undeformed states of the object.

The first example of a numerically reconstructed phase contrast image has been reported in 1997 by E. Cuche et al., "Tomographic optique par une technique d'holographie numérique en faible coherence," J. Opt. 28, 260–264 (1997). who have used a modified reconstruction algorithm including a multiplication of the digital hologram by a digital replica of the reference wave (digital reference wave). In Ref. Cuche et al., the phase contrast image has been obtained with a plane wave as reference and in direct observation, meaning that no magnification or demagnification optics is introduced along the optical path of the object wave.

SUMMARY OF THE INVENTION

In comparison with existing methods for phase contrast microscopy, such as the Zernicke or the Nomarski methods, the present invention provides a straightforward link between phase contrast imaging and optical metrology.

"Quantitative phase contrast" means that the phase contrast image is free of artifacts or aberrations and can be directly used for quantitative measurements of optical properties (e.g. refractive index) or structural information (e.g. topography, thickness). More precisely, "quantitative phase contrast" means here that the value of each pixel of the phase contrast image is equal, modulo $2\pi$, to the value of the phase of the object wave at the corresponding area of specimen.

"Simultaneous amplitude and quantitative phase contrast" means that two images of the specimen can be reconstructed from the same hologram. One of these images with an amplitude contrast and the other one with a quantitative phase contrast. These images can be analyzed separately or compared the one with the other. Their information content (or the information content of several pairs of images reconstructed for different orientations of the specimen) can be associated in order to build a computed three-dimensional description of the specimen, for example a three-dimensional tomography of semi-transparent specimens. Spectroscopic measurements are also possible with the present invention by recording two or more holograms of the same specimen at different wavelengths. Such multi-wavelength procedure can also be useful for the precise determination of objects dimensions or refractive index in metrology.

In comparison with standard interference microscopy techniques which also provides simultaneously amplitude and quantitative phase contrasts, the advantage of the present invention is that the recording of only one hologram is necessary while the recording of four or more interferograms is required with interference microscopy. Moreover, no displacement or moving of optical elements is needed with the present invention. As a consequence, the acquisition time is reduced providing a lower sensitivity to thermal and mechanical drifts. Robustness is a great assess of the present invention.

An other important advantage of the present invention in comparison with interference microscopy is that the phase aberrations are corrected digitally. Indeed, a microscope objective which is introduced in an interferometer produces a curvature of the wavefronts which affects the phase of the object wave. Therefore, for phase contrast imaging with the present invention or more generally in any interferometric system, this phase aberration must be corrected. In interference microscopy, this problem is solved experimentally by inserting the same microscope objective in the reference arm, at equal distance from the exit of the interferometer. This arrangement called Linnick interferometer requires that if any change has to be made in the object arm, then the same change must be precisely reproduced in the reference arm in such a way that the interference occurs between similarly deformed wavefronts. As a consequence the experimental configuration requires a very high degree of precision. An other possibility (Mirrau interferometry) consists in magnifying the interference pattern. However, it is difficult to achieve high resolution imaging with this technique because a miniaturized interferometer must be inserted between the sample and the microscope objective. The present invention proposes a purely digital method which allows us to perform the correction by multiplying the reconstructed wavefront with the computed complex conjugate of the phase aberration.

Depending on the configuration used for the recording of the hologram, the physical interpretation of amplitude and quantitative phase contrasts vary. If the hologram is recorded with the wave that is reflected by the specimen (reflection geometry), the amplitude contrast depends on variations of the reflectance at the specimen surface and the phase contrast depends on the topography of the specimen and/or on changes of the phase shift at the reflection. If the hologram is recorded with the wave that is transmitted by a transparent or semi-transparent specimen (transmission geometry), the amplitude contrast is related to changes in absorption and the phase contrast depends on variations of the thickness and/or of the refractive index (or more generally on variations of the optical path).

In most cases, quantitative measurements of optical properties or structural information, on the basis of phase measurements is ambiguous because phase contrast generally has more than one origin. For example, the measurement of the refractive index of a transparent specimen requires the knowledge of the thickness and inversely the measurement of the thickness requires the knowledge of the refractive index. For topographic measurements with specimens composed of different materials, the analysis of the results must take into account the variation of the phase change on the reflection interface, if the complex index of refraction of the different materials is not the same. If a pure topographic or a pure refractive index or a pure thickness measurement is desired, known methods such as ellipsometry or multi-wavelength measurements could be used in combination with the present invention. In particular, refractive index measurement on a transparent specimen of unknown thickness can be performed by recording two or more holograms at different wavelengths. Assuming that the thickness of the specimen is constant for each hologram, variations of the reconstructed phase distributions are due to variations of the refractive index as a function of the wavelength. Using a model describing the variation of the refractive index as a function of the wavelength, the refractive index of the specimen or its thickness can be deduced from the quantitative phase contrast images. With a semi-transparent specimen (e.g. biological cells or tissues) or more generally with a 3D-scene composed of several reflective elements located at different depth, if a gating technique is used, such as time or coherent gating, the hologram can be recorded, in the reflection geometry, with the light that is reflected by a selected slice inside the specimen. In this case, both contrasts (amplitude and phase) depend on the optical properties of the selected slice and on the optical properties of other volumes inside the specimen where the light has traveled before and after the reflection.

The present invention provides a more general method for the numerical reconstruction of both amplitude and quantitative phase contrast images from a digital hologram. The numerical method for the hologram reconstruction comprises the calculation of a digital replica of the reference wave called digital reference wave. An array of complex numbers called digital phase mask is also calculated in order to correct the phase aberrations of the imaging system.

The present invention provides unique results. The technique provides a quantitative phase contrast meaning that the reconstructed phase distribution can be directly used for applications in metrology, in particular for surface profilometry, refractive index measurements or more generally for quantitative material testing (shape and position measurements, surface roughness measurement, optical properties measurement). Moreover, an amplitude contrast image of the specimen can be reconstructed from the same hologram. It is an important feature of the present invention that a three dimensional description of the specimen can be obtained digitally with only one image acquisition.

The possibility of instantaneous acquisition of the amplitude and of the quantitative phase with a pulsed source or a time gated camera is a great advantage of the present invention.

Basically, the numerical reconstruction method performs a calculation which describes the propagation of the wavefront that would be diffracted by the hologram during a standard holographic reconstruction. The calculation consists in a numerical evaluation of the diffraction pattern which is produced in an observation plane when the hologram is illuminated by a replica of the reference wave. The scalar description of the diffraction is considered and the reconstruction method consists in the numerical calculation of the Fresnel-Kirchhoff integral or of the Rayleigh-Sommerfeld integral. Depending on the configuration used for the hologram creation, the diffraction calculation can be performed using an approximation of these integrals such as the Fraunhofer or the Fresnel integrals. In some cases such as Fourier holography, a simple Fourier transform calculation can be used.

In a preferred manner, the configuration used for the hologram creation, in particular the distance between the hologram and the specimen, is adjusted in such a way to produce a Fresnel hologram for which the diffraction calculation can be performed in the Fresnel approximation. The advantage of the Fresnel approximation is that the computations are simple and can be performed very fast using a discrete formulation of the Fresnel integral expressed in terms of a Fourier transform. In addition, a wide range of experimental configurations are covered by the Fresnel approximation.

An important feature of the present invention is that image reconstruction, in both amplitude and phase contrast, requires the adjustment of several constants which are involved by the numerical reconstruction method. These constants are called reconstruction parameters and their values are defined by the experimental configuration. The reconstruction parameters can be divided into three categories: the reconstruction distance which is related to image focusing; the reference wave parameters which are related to the definition of the digital reference wave; and the aberration correction parameters which are related to the definition of the digital phase mask. It is an object of the present invention to describe how these reconstruction parameters are defined and how their values must be adjusted. It is clear that the values of the reconstruction parameters are fixed for a given experimental configuration and that the same values of the reconstruction parameters can be used to reconstruct several holograms without new adjustment procedures if the experimental configuration is the same for these holograms.

Other parameters such as the wavelength, the detector size and the number of pixels are requested by the numerical reconstruction method but these parameters have, in general, constant values and do not require a special adjustment.

BRIEF DESCRIPTION OF THE DRAWINGS

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

FIG. 2B in a Michelson configuration. FIG. 2C in a Mach-Zender configuration for transmission imaging. FIG. 2D in a Mach-Zender configuration for reflection imaging.

FIG. 8A shows the phase contrast image obtained when all the reconstruction parameters are adequately adjusted, FIG. 8B shows the result obtained with an inadequate adjustment of the aberration correction parameters. FIG. 8C shows the result obtained with an inadequate adjustment of the reference wave parameters.

FIGS. 10A and 10B show respectively the amplitude contrast image and the quantitative phase contrast image of a USAF test target. FIGS. 10C and 10D show respectively the amplitude contrast image and the quantitative phase contrast image of a pure phase object. FIGS. 10E and 10F show respectively the amplitude contrast image and the quantitative phase contrast image of a biological cell.

FIG. 12A illustrates an exemplary portion of a generalized computer system upon which portions of the invention may be implemented.

DETAILED DESCRIPTION OF THE INVENTION

The embodiments of the present invention will be described in more details with reference to the drawings.

Figure 1:
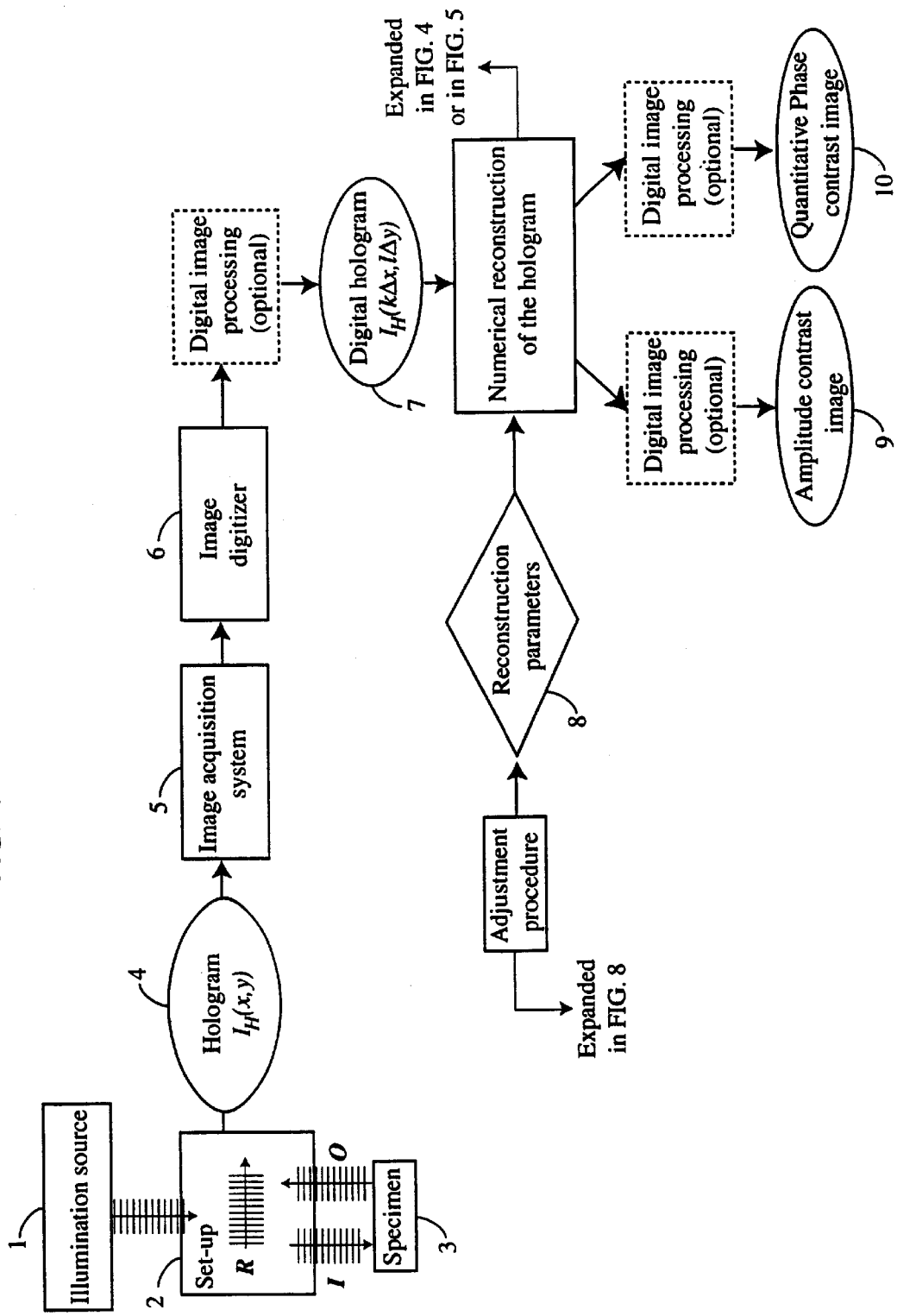
FIG. 1 is a view showing diagrammatically the different steps of the imaging procedure.

FIG. 1 shows diagrammatically the different steps of the entire imaging procedure. The beam emitted by an illumination source 1 illuminates a set-up 2 which creates a hologram 4 of the specimen 3. The set-up 2 collects the light from an illumination source 1 and provides illumination 1 of the specimen 3, it includes also a device for creating a reference wave R and a device for creating an object wave O from the light transmitted or reflected or scattered by the specimen 3. The object wave O and the reference wave R are combined in such a way that they interfere in a plane.

The interference between the reference wave R and the object wave O creates the hologram 4 which can be described as a two-dimensional distribution of intensity:

$$I_H(x,y)=|R|^2+|O|^2+R^*O+RO^* \tag{1}$$

where R* and O* are the complex conjugates of the reference and object waves respectively and $|R|^2, |O|^2$, the square of their modulus.

The present invention is not restricted to the optical domain and can be applied for the numerical reconstruction of holograms recorded with any kind of electromagnetic (e.g. X-ray) or non-electromagnetic (e.g. acoustics or heats) waves. Photon density waves can also be used. For this reason, the nature, the wavelength and the coherence of the illumination source 1 are not specified here. Gas lasers, semiconductor lasers, solid state lasers, laser diodes, superluminescent diodes, narrow and broadband sources, white light sources, piezoelectric transducers, X-ray sources, and electron beams, are examples of means which can be used as illumination source.

A combination of two or more illumination sources can also be used. For example, two illumination sources of different wavelengths can be combined in order to create an fat illumination source with a so called synthetic wavelength.

In a preferred manner, the set-up 2 is designed in such a way that the polarization of the reference wave R matches (as close as possible) the polarization of the object wave O. This closeness of the polarization of the object to that of the reference waves is important to optimize the interference between these two waves. If the object wave contains different kind of photons with different polarization states, as it happens for example when scattering events occur inside the specimen or when the birefringence of the specimen is not uniform, working with a fixed polarization of the reference wave allows one to select the photons of the object wave, the polarization of which is close to the polarization of the reference wave.

The device which creates the object wave O can include magnifications optics or demagnification optics. Direct imaging, without any optics between the specimen and the plane where the hologram is created, is also possible.

The term "magnification optics" is to be understood as being a single lens or an assembly of lenses and/or optical fibers which produces a magnified image of the specimen with a better resolution than direct imaging. The case of a magnification optics producing an image of the specimen, the size of which is the same as the size of the specimen (magnification equal to unity), is also included here.

The term "demagnification optics" is to be understood as being a single lens or an assembly of lenses and optical fibers which produces a smaller image of the specimen in order to allow imaging of larger specimens than is possible with direct imaging.

Figure 2A:
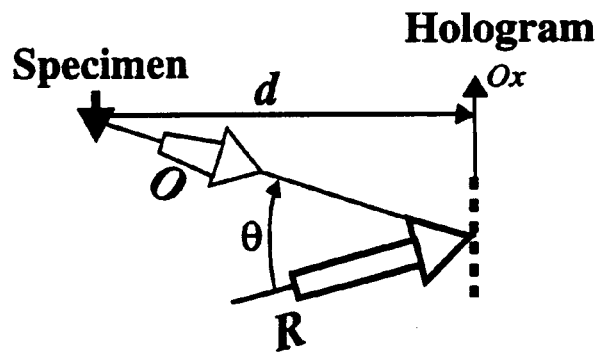
FIG. 2A is a view showing diagrammatically one of the possible configuration for the recording of an off-axis hologram.

In a preferred manner, the set-up 2 will be designed in order to produce an off-axis hologram. The term "off-axis hologram" is to be understood as meaning that the directions of propagation of the reference wave R and of the object wave O are not parallel, at their incidence on the plane where the hologram is created. The off-axis geometry advantageously permits to separate the zero order of diffraction, the real image and the twin image during the reconstruction. Several configurations can be used for the creation of an off-axis hologram. FIG. 2A presents one of the possible configurations with an angle θ between the directions of the object wave and of the reference wave at their incidence on the hologram plane.

Depending on the resolution of the media used for hologram recording, the off-axis geometry may be restricted to small angles in order to avoid that the spatial frequencies of the created interferogram exceed the resolution power of the recording media. In other words, the angle between the reference wave and the object wave, at their incidence on the plane where the hologram is created, must not exceed a certain value for which the interference fringes of the hologram are not resolved by the image acquisition system. The off-axis geometry may even be considered at the limit of very small angles, but in this case, the zero order of diffraction may cover parts or the entirety of the twin image or of the real image. In this case, additional methods can be used in order to suppress the zero order of diffraction. For example, a method proposed by T. M. Kreis and W. P. O. Jüptner, "Suppression of the dc term in digital holography," Opt. Eng. 36, 2357–2360 (1997) can be applied before the numerical reconstruction. However, this method, which consists in subtracting the mean intensity from the digital hologram permits only the elimination of the so-called dc term of the zero order of diffraction from the reconstructed images. In other words, if a reference wave of constant amplitude (for example a plane wave) is used for the hologram creation, the method proposed by M. Kreis and W. P. O. Jüptner reference can be described as being a method which produces a hologram of the following form:

$$I_H(x,y)=|O|^2+R^*O=RO^*$$

As a consequence, the object component of the zero order of diffraction ($|O|^2$), which is in general not constant in the hologram plane, is not suppressed by this method.

We propose here a method for the complete elimination of the zero-order of diffraction. In principle, this method can also be applied when the amplitude of the reference wave is not constant. In a general way, this method can be described as being a method which produces a hologram which contains only the interfering terms of the hologram:

$$I_H(x,y)=R^*O=RO^*$$

Such a result can be obtained by subtracting a locally evaluated value of the zero order of diffraction ($|R|^2+|O|^2$) from the digital hologram. For example, the digital hologram can be divided in small elements called submatrix of constant (or non-constant) sizes, and the method proposed by T. M. Kreis and W. P. O. Jüptner reference can be applied to each of these submatrix. The size and the number of the submatrix must be chosen in such a way to restore, with enough precision, the variations of the zero order of diffraction in the hologram plane. However the size of a submatrix must not be smaller tan a minimum size for which a submatrix contains only one constructive and one destructive interference.

Another aspect of the present invention is based on the application of a band-pass filter to the Fourier transform of the digital hologram, and which also allows for the complete elimination of the zero-order of diffraction. This method is based on the fact that, in off-axis holography, the spatial frequencies corresponding the interfering terms (R*O and RO*) are higher than the spatial frequencies which correspond to the zero order of diffraction ($|R|^2+|O|^2$). As a consequence, we propose to apply, optionally, before the numerical reconstruction of the digital hologram, a digital image processing method which includes the steps of:

computing the two dimensional (2D) discrete Fourier transform of the digital hologram;

locating, in the Fourier transform of the digital hologram, the spatial frequencies which correspond to the interfering terms R*O and RO*;

computing the multiplication of the Fourier transform of the hologram by a 2D function which eliminates or attenuates the spatial frequencies which do not correspond to the interfering terms. This operation removes (or attenuates) the spatial frequencies which correspond to the zero order of diffraction and can also remove other parasitic spatial frequencies;

computation of the discrete inverse Fourier transform;

At this step, as a consequence of the suppression of the low spatial frequencies of the hologram, a filtered digital hologram with a constant zero order is obtained. The value of the zero order is equal to the mean intensity calculated for the entire hologram area. Therefore, the zero order can be completely suppressed by subtracting the mean intensity to the intensity of each pixel of the filtered digital hologram.

With reference to FIG. 1, the application of the above mentioned Fourier filtering image processing is one of the possible digital image processing which can be optionally applied before and/or after the numerical reconstruction of the hologram. At this step, several digital image processing treatments can be applied in order to improve the signal to noise ratio or in order to enhance the fringes visibility of the digital hologram 7. For example brightness and contrast adjustment, offset subtraction, modification of the distribution of gray a levels, thresholding, application of phase unwrapping methods to the quantitative phase contrast image, application of histogram equalization, application of two-dimensional high-pass spatial frequency filters or low-pass spatial frequency filters, application of one or several two-dimensional band-pass spatial frequency filters, application of statistical operations on a set of several images, application of image processing treatment in order to suppress the zero order of diffraction and/or the twin image and/or the real image. It is also possible to increase or to decrease the number of pixels of the digital hologram. The digital hologram can also be multiplied by a two-dimensional function (for example a Hanning or a Hamming or a Gaussian window) in order to perform data windowing. This feature of a possible digital image processing treatment of the hologram is one of the advantage of the present invention in comparison with standard holographic methods which use, for example, photographic plates as recording media and which do not allow for such a straightforward processing of the hologram, before its reconstruction.

Figure 2B:
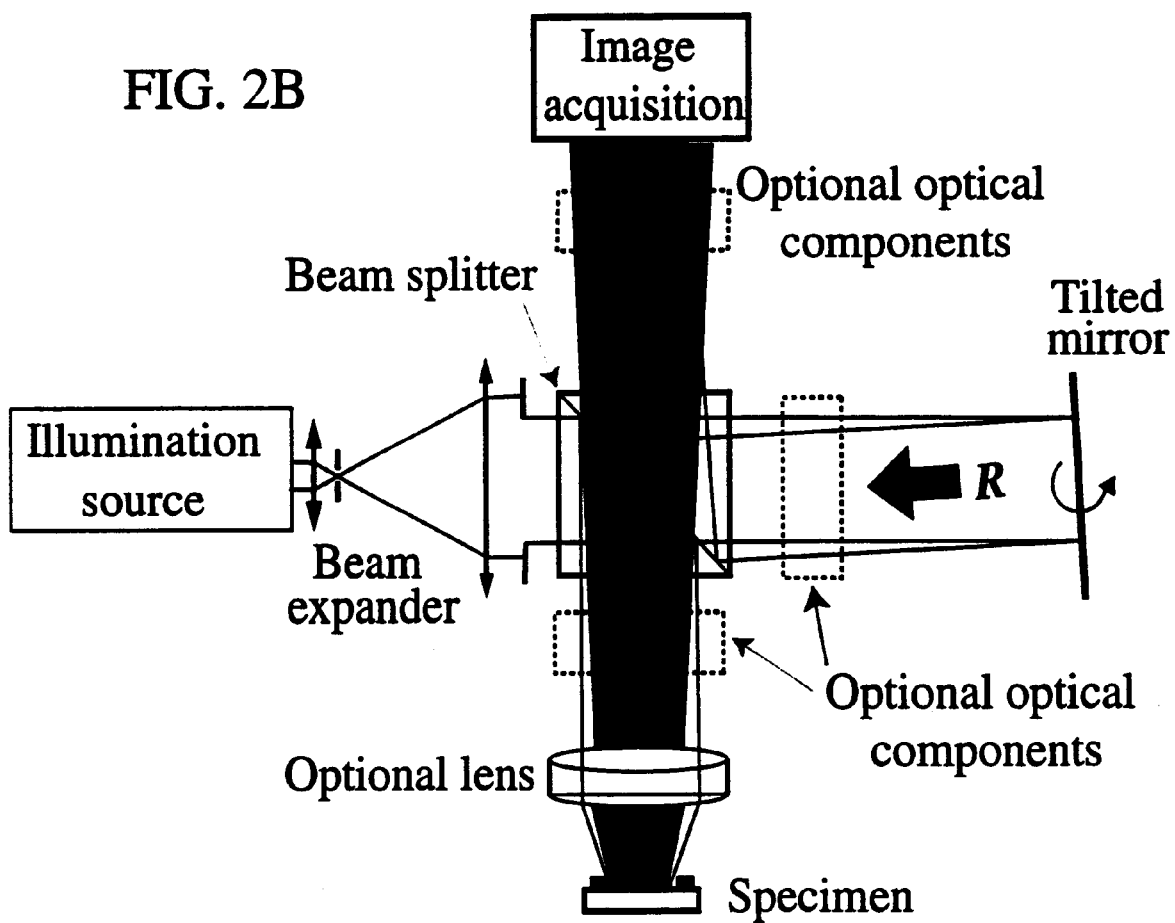
FIGS. 2B, 2C and 2D are views showing diagrammatically three of the possible realizations of the set-up.

Assuming that with off-axis holography the zero order of diffraction corresponds to low spatial frequencies, its suppression can also be performed experimentally by spatially filtering the hologram 4 before acquisition of the image. This operation can be performed using a so-called 4-f system composed of two lenses of focal length with a high-pass mask located in the Fourier plane of the first lens. With reference to FIG. 2B, such a 4-f system can be considered as being an example of said optional optical elements which can be inserted between the beam splitter and the image acquisition.

The extreme case of in-line or Gabor holograms can also be considered with the present invention. In this case, the present invention can be used in combination with other methods (image processing methods or experimental procedures) for the elimination of the zero order of diffraction and/or for the elimination of the twin or real image. For example, a method which is similar to interference microscopy has been proposed by I. Yamaguchi and T. Zhang, "Phase-shifting digital holography", Opt. Lett. 22, 1268–1270 (1997). This method requires the recording of four interferograms taken with phase shifts (of 90°) of the reference wave and allows the suppression of both the zero order of diffraction and the twin image. In this case, or more generally when a procedure is used to shift or to modulate the phase of the reference wave and/or the phase of the object wave, the object wave can be measured in amplitude and phase in the hologram plane. The present invention can then be used in order to recover the amplitude and the phase at the surface of the specimen. Piezo actuated mirrors, acousto-optics or electro-optics or photo-elastic modulators are examples of optional optical elements which can be used to modulate or to shift the phase of the reference wave and/or of the object wave.

For a heterodyne detection, the creation of the reference wave R can include a device which modifies the wavelength of the reference wave with respect to the wavelength of the object wave. A similar device can also be inserted in the device which creates an object wave O. Acousto optic modulators, electro-optic modulators, photo-elastic modulators, piezo-electric driven mirrors are example of means which can be used to modulate the wavelength of the reference wave and/or of the object wave. These means are examples of optional optical components featured in FIGS. 2B, 2C and 2D. Physically distinct sources can also be used for the illumination and for the creation of the reference.

In a preferred manner, the set-up 2 will be designed in order to produce a Fresnel hologram. The term "Fresnel hologram" is to be understood as meaning that the hologram reconstruction can be performed by a calculation of scalar diffraction in the Fresnel approximation. The numerical calculation of the discrete Fresnel integral will be explained in details further. The advantage of the Fresnel approximation is that the computations are simple and can be performed very fast. In addition, a wide range of experimental configurations are covered by the Fresnel approximation.

If the set-up 2 used for the hologram creation do not satisfy the conditions of the Fresnel approximation, other approximations or exact evaluation of the Fresnel-Kirchoff or Rayleigh-Sommerfeld integrals can be used as models for the diffraction calculation.

A simple Fourier transform calculation or a diffraction calculation in the Fraunhofer approximation can also be used.

If a low-coherence illumination source is used, the set-up 2 will comprise a means which allows the adjustment of the length of the path of the reference wave R. Such a device is an example of optional optical components featured in FIGS. 2B, 2C and 2D.

Figure 2C:
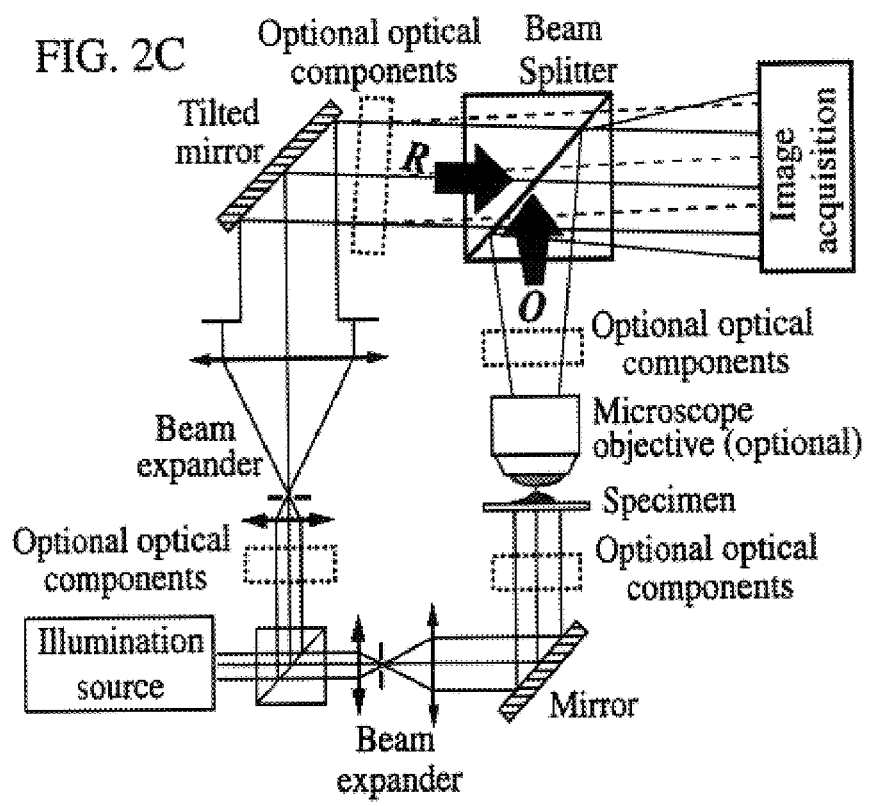
Figure 2D:
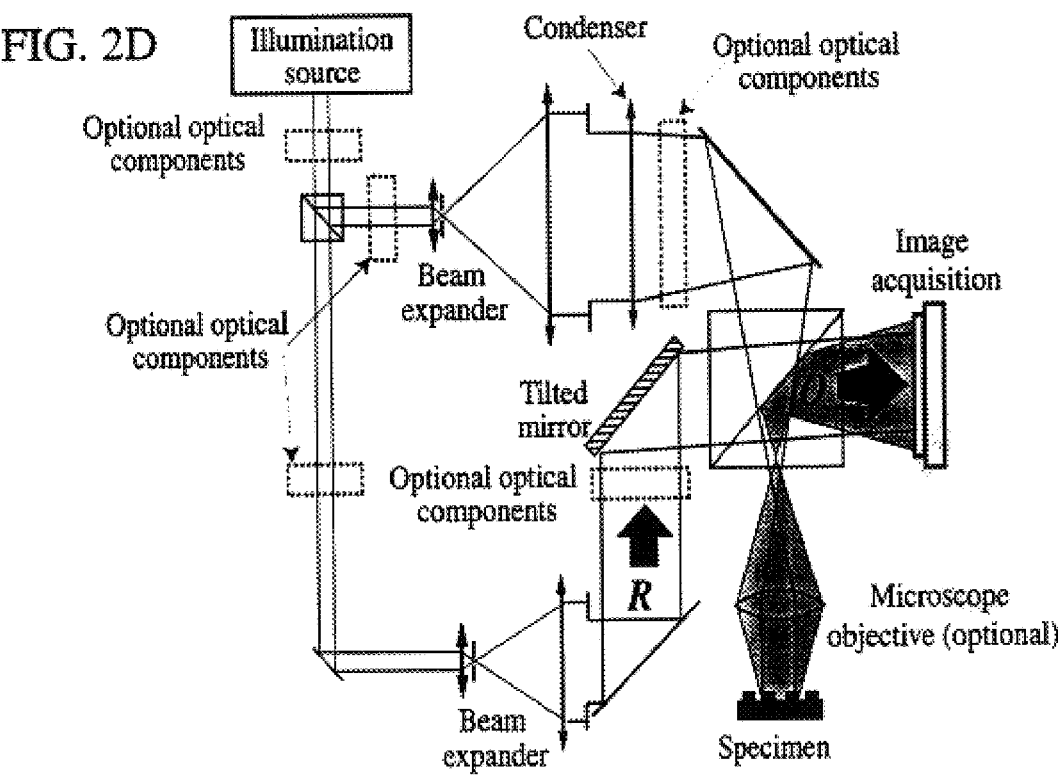

FIG. 2B, FIG. 2C and FIG. 2D present three possible realizations of the set-up 2. As shown in FIG. 2B, the set-up consists basically of a Michelson interferometer designed for imaging in the reflection geometry. The beam emitted by the illumination source is expended in diameter and the interferometer comprises a microscope objective in the object arm and a mirror in the reference arm which reflects a plane wave as reference R. If the mirror is tilted, with two degrees of freedom, off-axis holograms can be recorded. As shown in FIG. 2C, the set-up consists basically of a Mach-Zender interferometer designed for imaging in the transmission geometry. The interferometer comprises two beam expanders in each arm of the interferometer. A configuration with only one beam expander located just after the illumination source can also be used. The beam expander may include a pinhole for spatial filtering. In the object arm, a microscope objective collects the light that is transmitted by the specimen. In the reference arm, a mirror which can be tilted reflects a plane wave as reference R. As shown in FIG. 2D, the set-up consists basically of a Mach-Zender interferometer designed for reflection imaging. In the set-up of FIG. 2D, a lens with a long focal length is inserted between the beam expander and the microscope objective. This lens acts as a condenser and its position is adjusted in order to illuminate the sample through the microscope objective with a collimated beam. This condenser is important for reflection imaging because, as explained later, in holographic microscopy the specimen can be located near the object focal plane of the microscope objective. If necessary, for example if a high intensity is desired for the object illumination, a condenser can also be inserted before the specimen in the transmission geometry presented in FIG. 2C. This condenser is an example of optional optical components featured in FIG. 2C. These examples of set-up are adequate for the creation of Fresnel off-axis holograms. Additional elements called optional optical elements (see FIGS. 2B, 2C, and 2D) can be introduced in both arms of the interferometer and/or before and/or after the beam splitters located at the entrance and/or at the exit of the interferometers. Neutral density filters, prisms, retarding means, half-wave plates, quarter-wave plates, polarizing plates, Wollaston prisms, iris diaphragms, lenses, spatial filters, pinholes are examples of optional optical elements. As shown in dotted lines in FIG. 2C, a Wollaston prism can be used to separate the reference wave into two components with crossed polarizations and different directions of propagation. Polarizing beam splitters can also be used instead of simple beam splitters. With each of the presented set-ups, direct imaging is possible by removing the microscope objective or the lens and the present invention can be used as a method for lensless imaging.

The advantage of a configuration based on a standard interferometer configuration is that it allows the recording of off-axis holograms with very small angles between the directions of propagation of the object and reference waves. This feature is important when low-resolution media such as a CCD camera are used as image acquisition systems. In addition, these configurations based on a standard interferometer geometry are appropriate for the creation of Fresnel holograms of small specimen.

In the examples of set-ups presented in FIGS. 2B, 2C and 2D, or more generally in any kind of set-up, optional optical elements can be inserted along the paths of the reference wave and/or along the path of the object wave. For example, modulators which modify the wavelength and/or the amplitude and/or the frequency and/or the polarization and/or the phase and/or the optical path length of the waves. Polarizers, half and quarter wave plates, Wollaston prisms, neutral density filters, acousto-optic modulators, liquid crystal devices, dielectric media, assembly of prisms and/or mirrors are example of means which can be used as optional optical elements.

Many other configurations can be used for the design of the set-up 2 with, FIGS. 2B, 2C and 2D being shown as illustrations of possible examples.

Between the plane where the hologram is created and the plane where an image of the hologram is acquired, an assembly of optics components (for example lenses and optical fibers) can be introduced. For example, the hologram can be recorded at the distal end of a rigid or flexible endoscope.

When magnification optics or demagnification optics are introduced along the path of the object wave, the present invention includes a digital method for the correction of the associated phase aberrations.

The term "phase aberrations" is to be understood as being a deformation of the wavefronts which travel across magnification or demagnification optics. The correction of the phase aberrations compensate for this wavefronts deformation and allows to recover the phase distribution of the original wavefronts.

An image acquisition system 5 acquires an image of the hologram 4. Any kind of existing or further developed image acquisition system or image sensor can be used. Because the numerical reconstruction method is fast, rapid or real-time acquisition systems such as a video camera can be used. Charged Coupled Device (CCD) camera, intensified or cooled CCD, progressive scan CCD, line-scan camera, electron bombardment CCD (EB CCD) high resolution camera, integrating CCD, numerical or digital camera, CMOS image sensors, array of photodiodes, array of sensors, array of acoustic sensor, are examples of devices which can be used as image acquisition system. Slower image acquisition systems which acquires an image of the hologram by scanning a sensor in a plane with a mechanical device can also be used. An image of the hologram can also be recorded on a photographic plate, on a photopolymer film or using an other photo-chemical process. A photorefractive crystal can also be used as image acquisition system.

In order to allow the transfer of the image to a computer, an image digitizer 6 performs the digitalization (typically a framegrabber or more generally a device which performs an analog to digital conversion) of the acquired image of the hologram.

Objects and features of the method for the numerical reconstruction of the digital hologram are described in more details in the following.

The image resulting from the various means described previously is called a digital hologram 7 and is an array $I_H(k\Delta x, l\Delta y)$ of $N_x \times N_y$ digitally encoded numbers which results from the two-dimensional spatial sampling of the hologram intensity $I_H(x,y)$. This two-dimensional spatial sampling can be performed by the image acquisition system and/or by the image digitizer. In a preferred manner, the image sensor is rectangular and the spatial sampling is regular (with constant sampling intervals). In this case, $I_H(k\Delta x, l\Delta y)$ can be expressed from $I_H(x,y)$ as follows:

$$I_H(k\Delta x, l\Delta y) = I_H(x,y) rect\left(\frac{x}{L_x}, \frac{y}{L_y}\right) \quad (2)$$

$$\sum_{k=1}^{N_x} \sum_{l=1}^{N_y} \delta(x - k\Delta x, y - l\Delta y)$$

where $\delta(x,y)$ is a two dimensional Dirac delta function, k,l are integers, $L_x \times L_y$ is the area of the acquired image of the hologram (the area of the sensitive surface of the image acquisition system), rect(x,y) is a function the value of which is 1 if the point of coordinates (x,y) is inside the acquired part of the hologram and 0 elsewhere. $\Delta x$ and $\Delta y$ are the sampling intervals along the 0x and 0y directions respectively. For example, if the image acquisition system or the image digitizer produces a rectangular image which contains $N_x$ lines along the 0x axis and $N_y$ lines along the 0y axis, we have:

$$\Delta x = \frac{L_x}{N_x}, \quad (3)$$

$$\Delta y = \frac{L_y}{N_y}, \quad (4)$$

where $L_x$ and $L_y$ are the dimensions of the digital image along respectively the $0_x$ and the $0_y$ axis.

An amplitude contrast image 9 and a quantitative phase contrast image 10 of the specimen 3 are numerically reconstructed from the digital hologram 4. The reconstruction method requires the adjustment of several reconstruction parameters 8 which define the geometry used for the hologram creation (specimen location, characteristics of the reference wave and of the magnification optics). The methods used for the numerical reconstruction of the hologram and the procedure for the adjustment of the reconstruction parameters will be explained in further detail.

The term "reconstruction parameters" 8 is to be understood as being a set of constants which must be supplied to the program which executes the numerical reconstruction of the hologram. These constants can be supplied to the computer which executes the program by a human operator, by an apparatus which communicates with the computer or by an other program running on the same (or on an other) computer.

Figure 3:
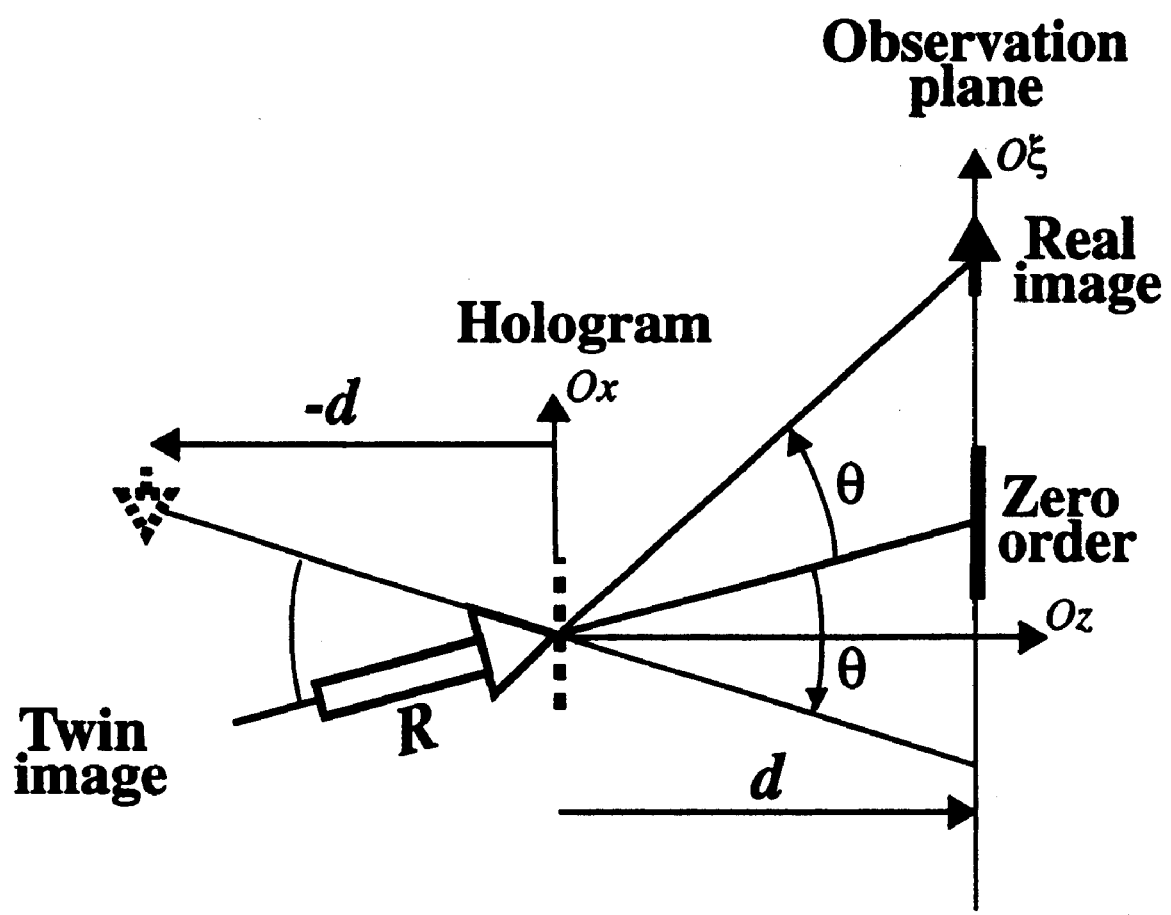
FIG. 3 is a view showing diagrammatically the standard optical reconstruction of an off-axis hologram which has been recorded as presented in FIG. 2A.

In classical holography, the hologram can be recorded on a photographic plate and the hologram reconstruction is performed optically by illuminating the hologram with a replica of the reference wave R as shown in FIG. 3. The transmitted wavefront $\Psi(x,y)=R(x,y)I_H(x,y)$ contains four terms:

$$\Psi(x,y) = R|R|^2 + R|O|^2 + |R|^2 O + R^2 O^* \quad (5)$$

The two first terms of Eq. (5) correspond to the zero order of diffraction, the third term to the twin image and the fourth term to the real image. As shown in FIG. 3, if the hologram has been recorded in an off-axis geometry, these three terms can be observed separately in the observation plane 0ξη. For an observer located in front of the hologram (behind the illuminated side), the virtual image appears as emitted by a replica of the specimen located at its initial position, while the real image is a converging term which is focused symmetrically with respect to the hologram. The zero order of diffraction corresponds to the part of the light that is not diffracted by the hologram and propagates along the direction of the reference wave. As shown in FIG. 3, the directions of observation of the twin image and of the real image form an angle of respectively $+\theta$ and $-\theta$ with respect to the direction of the reference wave, where $\theta$ is the angle between the directions of propagation of the reference wave R and of the object wave O during the recording of the off-axis hologram as shown in FIG. 2A. If $\theta$ is small or if the hologram is recorded without an incidence angle between the object wave and the reference wave ($\theta=0$), the real image, the twin image and the zero order can be partially or completely superimposed.

In the following, Oxy designates the coordinates of the hologram plane and $0\xi\eta$ the coordinates of the observation plane (the plane where the reconstruction of the hologram takes place).

As a result of the present invention, the numerical method for the hologram reconstruction simulates the standard optical reconstruction of a hologram. As presented in FIG. 3 the optical reconstruction is performed by illuminating the hologram with the reference wave R and the transmitted wavefront (Eq. (5)) propagates from the hologram plane $0xy$ to an observation plane $0\xi\eta$ where the real image is focused. With the present invention during reconstruction of a digital hologram, a digital transmitted wavefront $\Psi_D(k\Delta x, l\Delta y)$ is computed by multiplication of the digital hologram $I_H(k\Delta x, l\Delta y)$ by a digitally computed reference wave $R_D(k\Delta x, l\Delta y)$ later called the digital reference wave. Taking into account the definition of the hologram intensity (Eq. (1)), in the hologram plane:

$$\Psi_D(k\Delta x, l\Delta y) = R_D(k\Delta x, l\Delta y)I_H((k\Delta x, l\Delta y)) \quad (6)$$

$$= R_D|R|^2 + R_D|O|^2 + R_D R^* O + R_D R O^*,$$

where R is reference wave which has been used for the hologram recording called the experimental reference wave and O is the object wave. The calculation of the digital reference wave $R_D(k\Delta x, l\Delta y)$ requires the adjustment of several reconstruction parameters and will be described in details further.

This multiplication by a digital reference wave is essential for phase contrast imaging, because as presented in Eq. (6), it can be seen that if $R_D$ is equal to the experimental reference wave R, the product $R_D R^*$ becomes a real data slowly varying in the hologram plane and the phase of the twin image (O) is correctly reconstructed. Similarly, if $R_D$ is equal to $R^*$, the product $R_D R$ becomes a real data slowly varying in the hologram plane and the phase of the real image ($O^*$) is correctly reconstructed. In other words, the digital reference wave must be a digital replica of the experimental reference wave or a digital replica of its complex conjugate in order to perform phase contrast imaging.

Figure 4:
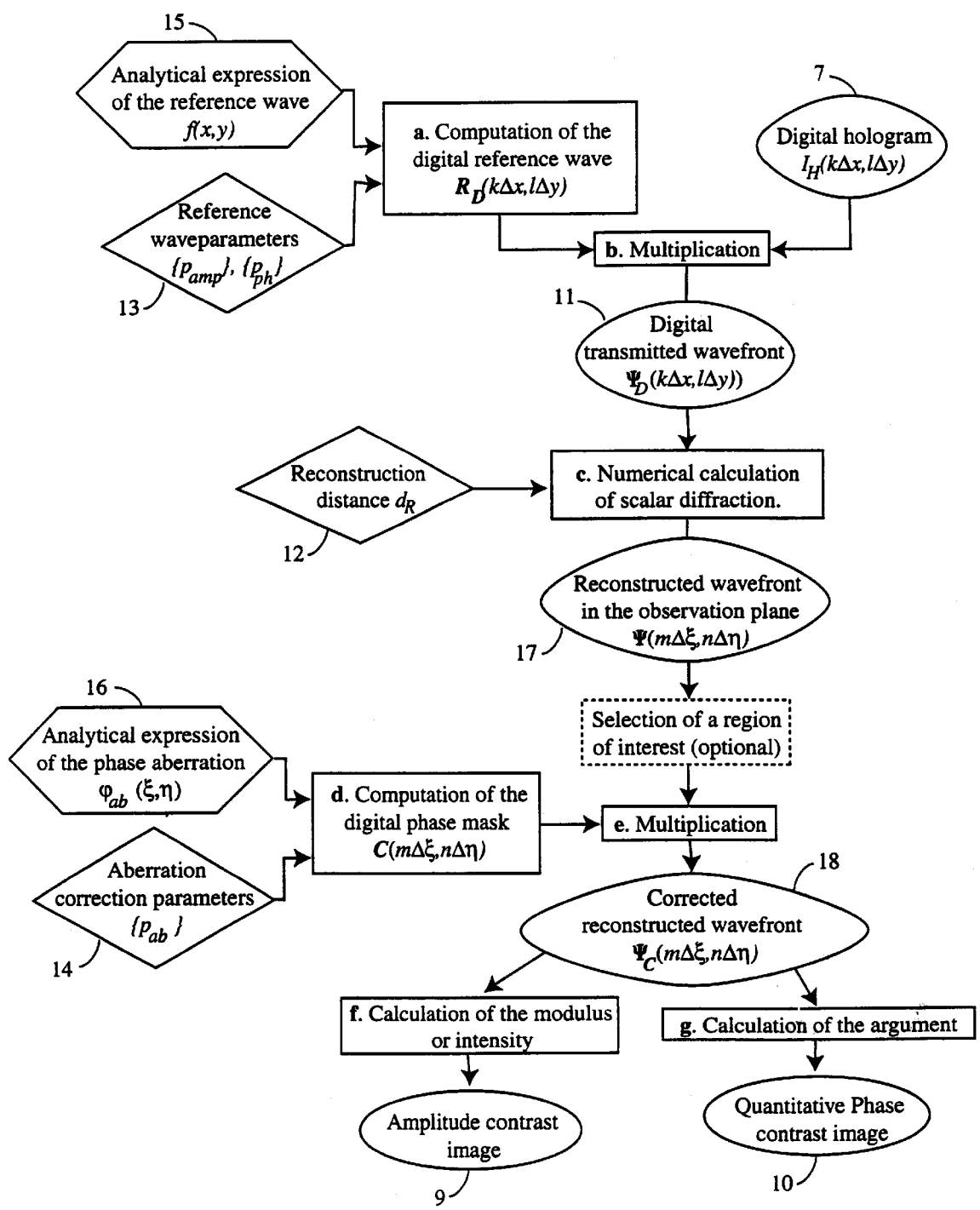
FIG. 4 is a view showing diagrammatically the different steps of computations of the numerical method for the reconstruction of a digital hologram.

FIG. 4 presents diagrammatically the steps of computations for the reconstruction of a digital hologram 7. The terms "reference wave parameters" 13, "reconstruction distance" 12 and "aberration correction parameters" 14 are to be understood as being "reconstruction parameters" 8 (see FIG. 1) as defined previously in this section. The entire procedure can be divided into seven steps:

a. Computation of the digital reference wave: The digital reference wave is an array $R_D(k\Delta x, l\Delta y)$ of complex numbers which is computed on the basis of an analytical expression of the reference wave $f(x,y)$ 15, the expression of which is defined by the geometrical and optical characteristics of the set-up. The analytical expression of the reference wave involves two sets of reference wave parameters $\{P_{amp}\}$ and $\{P_{ph}\}$ 13 which must be adjusted for a precise description of the wavefronts of the digital reference wave. $f(x,y)$ is a two-dimensional complex function which is defined in such a way that the digital reference wave reproduces as well as possible the reference wave R which has been used to create the hologram $f(x,y)$ can be expressed as follows:

$$f(x, y) = Amp(x, y, \{P_{amp}\})exp[iph(x,y,\{P_{ph}\})] \quad (7)$$

where $Amp(x,y,\{P_{amp}\})$ and $ph(x,y,\{P_{ph}\})$ are real functions, which define respectively the amplitude and the phase of $f(x,y)$.

The computation of the digital reference wave is performed by evaluating $f(x,y)$ for discrete values of x and y: $R_D(k\Delta x, l\Delta y)=f(k\Delta x, l\Delta y)$, where k and l are integers ($-N_x/2 \leq k \leq N_x/2$ and $-N_y/2 \leq l \leq N_y/2$) and $-N_y/2 < l < N_y/2$) and where $\Delta x$ and $\Delta y$ are the sampling intervals in the hologram plane as defined by Eqs. (3) and (4). If the spatial sampling of the hologram is performed on an irregular and/or non rectangular network, the computation of the digital reference wave must be performed on the same network.

For example, if a plane wave (or a good approximation of a plane wave) of given wavelength $\lambda$ is used for the hologram creation, the digital reference wave can be computed using the following expression:

$$R_D(k\Delta x, l\Delta y) = A_R \exp\left(i\frac{2\pi}{\lambda}(k_x k\Delta x + k_y l\Delta y)\right), \quad (8)$$

where $k_x$, $k_y$ and $A_R$ are the reference wave parameters. $k_x$ and $k_y$ are two real numbers which represent the components of the normalized wavevector (direction of propagation of the plane wave) and $A_R$ is real number which represents the amplitude of reference wave.

For example, if a spherical wave (or a good approximation of a spherical wave) of given wavelength $\lambda$ is used for the hologram creation, the digital reference wave can be computed using the following expression:

$$R_D(k\Delta x, l\Delta y) = \frac{A_R}{\sqrt{(k\Delta x - x_R)^2 + (l\Delta y - y_R)^2 + z_R^2}}$$

$$\exp\left(i\frac{2\pi}{\lambda}\sqrt{(k\Delta x - x_R)^2 + (l\Delta y - y_R)^2 + z_R^2}\right)$$

where ($x_R$, $y_R$, $z_R$) are the coordinates of the point source with respect to the center of the hologram plane $0xy$ and $A_R$ is the amplitude of spherical wave at the point source.

Paraboloidal waves, Gaussian beams or wavefront representation with Zernicke polynomials are other examples of models which can be used for the calculation of the digital reference wave.

The function which describes the amplitude of $f(x,y)$ ($A(x,y)$) can also be measured by simply acquiring an image of the reference intensity in the absence of interference with the object wave.

Figure 6A:
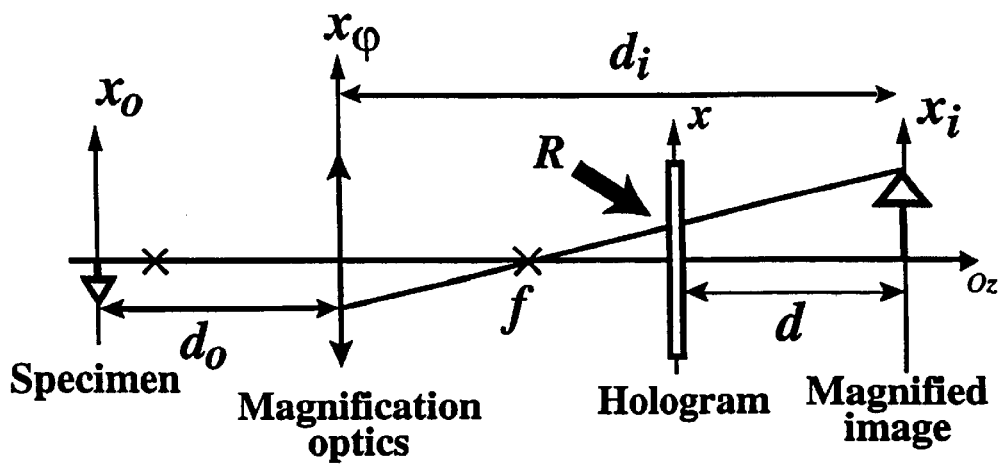
FIGS. 6A to 6C are views showing diagrammatically three of the possible configurations when a magnification optics is introduced along the optical path of the object wave, for the creation of a hologram of a magnified image of the specimen.
Figure 6B:
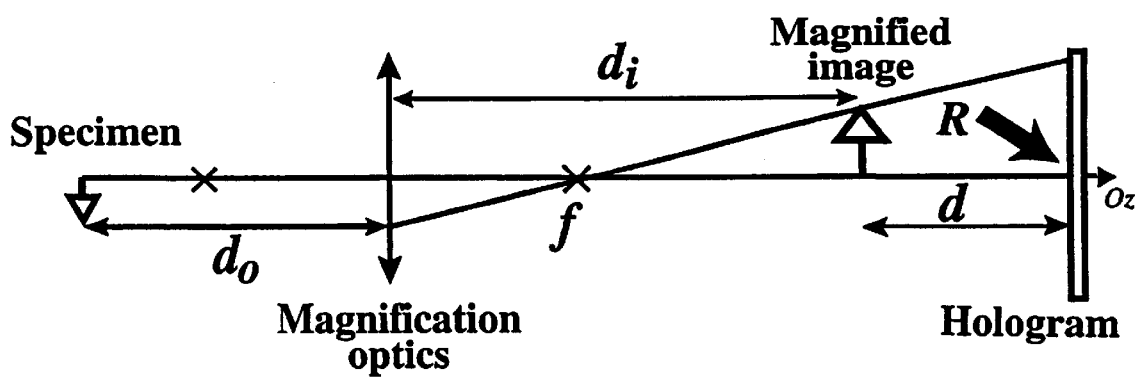
Figure 6C:
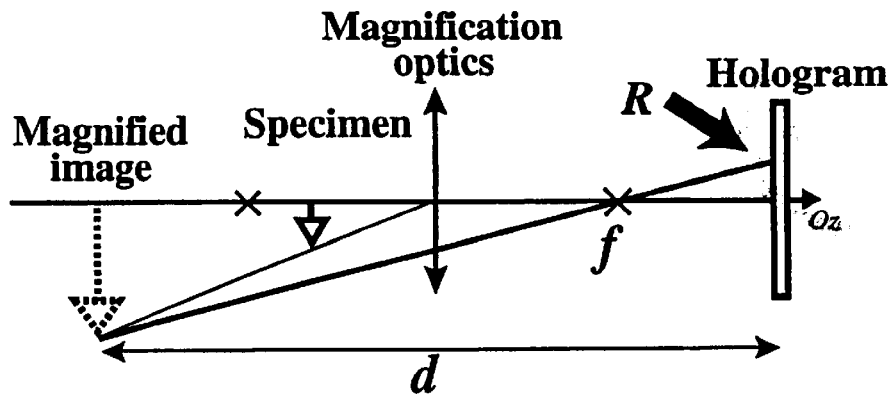

The phase of the digital reference wave can also be measured using an interferometric method with a reference object (a mirror for example). The measured phase can be directly used to define the digital reference wave. The interferogram can also be analyzed using a fringe analysis method or a wavefront fitting method. For example the measured wavefront can be fitted with an expansion in Zernicke polynomials in order to obtain a measured analytical expression of the reference wave.

b. Multiplication of the digital hologram 7 by the digital reference wave: Computation of the multiplication between the digital reference wave and the digital hologram. The result of this multiplication is an array of complex numbers which represents the digital transmitted wavefront in the hologram plane as defined by Eq. (6).

c. Numerical calculation of scalar diffraction: During this step, the propagation of the digital transmitted wavefront, from the hologram plane 0xy to an observation plane 0ξη, is computed by a numerical calculation of scalar diffraction. The distance between the hologram and the observation plane is defined by the reconstruction distance $d_R$ 12. Here, it must be specified that the term "observation plane" (coordinates 0ξη) is to be understood as being the plane in which the result of the scalar diffraction calculation is evaluated. In order to obtain well focused reconstructed images, the reconstruction distance $d_R$ must be equal to the distance between the specimen and the hologram during the hologram recording. When magnification or demagnification optics are used, the reconstruction distance must be equal to the distance between the hologram and the magnified (or demagnified) image of the specimen. The calculation of scalar diffraction can be performed by a numerical calculation of the Fresnel-Kirchhoff or Rayleigh-Sommerfeld integrals or by numerical calculation of an approximation of these integrals. In particular, the Fresnel approximation can be used and will be described in further detail. The result of this step is called the reconstructed wavefront in the observation plane $\Psi(m\Delta\xi, n\Delta\eta)$ 17, where m,n are integers ($-N_x/2 \leq m \leq N_x/2$ and $-N_y/2 \leq n \leq N_y/2$) and $\Delta\xi, \Delta\eta$ are the sampling intervals in the observation plane.

d. Computation of the phase mask: This step and the next step e. are only necessary when the optical set-up used for the hologram creation produces phase aberrations in the observation plane. For example when a magnification optics or a demagnification optics is introduced along the optical path of the object wave. Examples of such a configuration are shown in FIGS. 6A to 6C with magnification optics (M.O.), of focal length f, which produces a magnified image of the specimen. In FIG. 6A, the image plane $0x_iy_i$ is located at a distance $d_i$ from the plane of the M.O. ($0x_\phi y_\phi$), the specimen is located in the object plane $0x_o y_o$ at a distance $d_o$ from the M.O. and the hologram plane 0xy is inserted between the M.O. and the magnified image at a distance d from the image plane. The presented examples of possible arrangements (FIGS. 6A to 6C) correspond to standard configurations for holographic microscopy, M. Pluta, Holographic Microscopy, in Advances in optical and electron microscopy Vol. 10, (Academic Press, London, 1987). In these cases, the created hologram is not a hologram of the object itself but that of the magnified image. For this reason, the same symbol d designates the specimen-hologram distance in direct imaging (for example as presented in FIG. 2A) and the magnified (or demagnified) image-hologram distance in presence of magnification (or demagnification) optics (for example as presented in FIGS. 6A to 6C). Three possibilities exist for the location of the hologram plane 0xy with respect to the location of the magnified (or demagnified) image of the specimen. In FIG. 6A, the hologram is created (by interference with the reference wave R) between the M.O. and the magnified image. In FIG. 6B, the hologram is created behind the magnified image. It is also possible to create a hologram of a virtual (magnified as in FIG. 6C or demagnified) image of the specimen.

A particular case arises when the specimen is located in the object focal plane of the M.O. In this case, the distance between the image and the MO ($d_i$) is infinite and the hologram is recorded with the Fourier transform of the object field. As a consequence the reconstruction can be performed simply by computing the Fourier transform of the hologram intensity. With this configuration which is sometimes called Fourier holography, no adjustment of the reconstruction distance is necessary and the real and twin image are both in-focus.

Generally, because of its optical or geometrical properties, a magnification (or demagnification) optics produces a phase aberration in the image plane $0x_iy_i$. In a general way, the optical field $0_i(x_i,y_i)$ in the image plane of a magnification or demagnification optics can be expressed as follow:

$$0_i(x_i, y_i) = exp\{i\phi_{ab}(x_i, y_i)\} 0_c(x_i, y_i) \qquad (9)$$

where $exp\{i\phi_{ab}(x_i,y_i)\}$ is called the phase aberration function and where $0_c(x_i,y_i)$ is the "correct" or unaberrated optical field in the image plane which would correspond to an imaging system free of phase aberrations. $\phi_{ab}(x_i, y_i)$ is called analytical expression of the phase aberration 16 and will be used for the calculation of the phase mask. $\phi_{ab}(x_i, y_i)$ involves a set of reconstruction parameters (8 in FIG. 1) called aberration correction parameters $\{P_{ab}\}$ 14. The analytical expression of the phase aberration ($\phi_{ab}(x_i,y_i)$ 16 and the number of elements in $\{P_{ab}\}$ depend on the shape, on the material and on the geometrical arrangement of the components of the magnification or demagnification optics. In most cases, the phase aberrations depends also on the distance between the specimen and the magnification or demagnification optics (e.g. $d_o$ as defined in FIG. 6A).

When magnification or demagnification optics are used, the reconstruction distance $d_R$ 12 is correctly adjusted (the real image or the twin image are in focus), when the observation plane 0ξη matches the image plane $0x_i,y_i$. As a consequence, if a phase aberration is produced in the image plane during the hologram creation, the same phase aberration appears in the observation plane. As a consequence, the reconstructed wavefront $\Psi(m\Delta\xi, n\Delta\eta)$ 17 can be expressed as a function of a correct reconstructed wavefront $\Psi_c(m\Delta\xi, n\Delta\eta)$ 18 in a way similar to that presented in Eq. (9). As a consequence, if $\Psi(m\Delta\xi, n\Delta\eta)$ 17 is multiplied by the complex conjugate of the phase aberration function, a corrected reconstructed wavefront $\Psi_c(m\Delta\xi, n\Delta\eta)$ 18 can be obtained. The purpose of steps d. and e. is to perform this operation digitally.

An array of complex numbers called digital phase mask $C(m\Delta\xi, n\Delta\eta)$ is computed on the basis of an analytical expression of the phase aberration $\phi_{ab}(\xi,\eta)$ 16:$C(m\Delta\xi, n\Delta\eta) = exp\{-i\phi_{ab}(m\Delta\xi, n\Delta\eta)\}$, where m,n are integers ($-N_x/2 \leq m \leq N_x/2$ and $-N_y/2 \leq n \leq N_y/2$) and $\Delta\xi, \Delta\eta$ are the sampling intervals in the observation plane. The analytical expression of the phase aberration is defined in such that the digital phase mask represents as well as possible the complex conjugate of the phase aberration function in the observation plan. A set of reconstruction parameters called aberration correction parameters $\{P_{ab}\}$ 14 are involved by $\phi_{ab}(\xi,\eta)$ and allows a precise adjustment of the digital phase mask $C(m\Delta\xi, n\Delta\eta)$.

For example, if a single spherical lens (or a good approximation of it) is used as magnification or demagnification optics, the digital phase mask $C(m\Delta\xi, n\Delta\eta)$ can be expressed as follows:

$$C(m\Delta\xi, n\Delta\eta) = \exp\left\{\frac{i\pi}{\lambda D}((m\Delta\xi)^2 + (n\Delta\eta)^2)\right\},\quad (10)$$

aberration correction parameter which depends on the specimen-lens distance $d_o$ and on the lens-magnified image distance d; (see e.g. FIG. 6A):

$$\frac{1}{D} = \frac{1}{d_i}\left(1 - \frac{d_o}{d_i}\right). \quad (11)$$

Eq. (11) can also be expressed as a function of the focal length of the single lens using the standard relation: $1/f = 1/d_o + 1/d_i$.

The expression of the digital phase mask as presented in Eq. (10) correspond in fact to a paraboloidal approximation of the phase aberration. This simple approximation can be applied efficiently to correct the phase aberrations produced by standards magnification or demagnification optics such as microscope objectives. The advantage of this approximation is that only one aberration correction parameter (D) is involved.

It is known however that the phase aberrations produced by a microscope objective are more complex and more sophisticated models can be used for the computation of the digital phase mask.

The wavefront deformation which produces the phase aberration can also be measured using an interferometric method with a reference object (for example a mirror). The measured phase can be directly used to define the digital phase mask. The interferogram can also be analyzed using a fringe analysis method or with a wavefront fitting method. For example the measured wavefront deformation can be fitted with an expansion in Zernicke polynomials in order to obtain a measured analytical expression of the phase aberration.

e. Multiplication between the digital phase mask and the reconstructed wavefront in the hologram plane:

The corrected reconstructed wavefront $\Psi_c(m\Delta\xi, n\Delta\eta)$ 18 can be obtained by computing the multiplication between the reconstructed wavefront in the observation plane $\Psi(m\Delta\xi, n\Delta\eta)$ 17 and the digital phase mask $C(m\Delta\xi, n\Delta\eta)$:

$$\Psi_C(m\Delta\xi, n\Delta\eta) = C(m\Delta\xi, n\Delta\eta)\Psi(m\Delta\xi, n\Delta\eta) \quad (12)$$
$$= \exp\{-i\varphi_{ab}(m\Delta\xi, n\Delta\eta)\Psi(m\Delta\xi, n\Delta\eta)\}$$

where m,n are integers and $\Delta\xi$, $\Delta\eta$ are the sampling intervals in the observation plane. This multiplication performs a digital correction of the phase aberrations. This point is specific to the present invention, in comparison with other existing interferometric techniques for optical imaging, because usually, when optics components are introduced in one arm of an interferometer, the associated phase aberration is optically compensated by the introduction of the same optics in the other arm of the interferometer (Linnick interferometer).

i. Calculation of the intensity or module: The distribution of intensity $I(m\Delta\xi, n\Delta\eta)$ of the reconstructed field in the observation plane is calculated by computing the square modulus of the corrected reconstructed wavefront 18:

$$I(m\Delta\xi, n\Delta\eta) = |\Psi_C(m\Delta\xi, n\Delta\eta)|^2 \quad (13)$$
$$= \text{Re}(\Psi_C(m\Delta\xi, n\Delta\eta))^2 + \text{Im}(\Psi_C(m\Delta\xi, n\Delta\eta))$$

The result is an array of real numbers which represents the amplitude contrast image 9. If the modulus is calculated instead of the square modulus, an other amplitude contrast image can also be obtained. As shown in FIG. 1, digital image processing treatments can be optionally applied to the computed amplitude or intensity distribution in order to improve the quality of the amplitude contrast image.

j. Calculation of the argument: The distribution of phase $\Phi(m\Delta\xi, n\Delta\eta)$ of the reconstructed field in the observation plane is calculated by computing the argument of the corrected reconstructed wavefront 18:

$$\Phi(m\Delta\xi, n\Delta\eta) = \arctan\left(\frac{\text{Im}(\Psi_C(m\Delta\xi, n\Delta\eta))}{\text{Re}(\Psi_C(m\Delta\xi, n\Delta\eta))}\right) \quad (14)$$

The result is an array of real numbers the values of which are restricted in the $[-\pi,\pi]$ (or $[0,2\pi]$) interval. This array represents the quantitative phase contrast image 10. Phase unwrapping techniques can be applied to the quantitative phase contrast image when the distribution of the optical phase associated to the specimen exceeds the $[-\pi,\pi]$ (or $[0,2\pi]$) interval. As shown in FIG. 1, digital image processing treatments can be optionally applied to the computed phase distribution in order to improve the quality of the quantitative phase contrast image. In this case, a particular attention must be paid to the fact that the applied digital image processing treatments do not affect the quantitative property of the reconstructed phase distribution.

Figure 5:
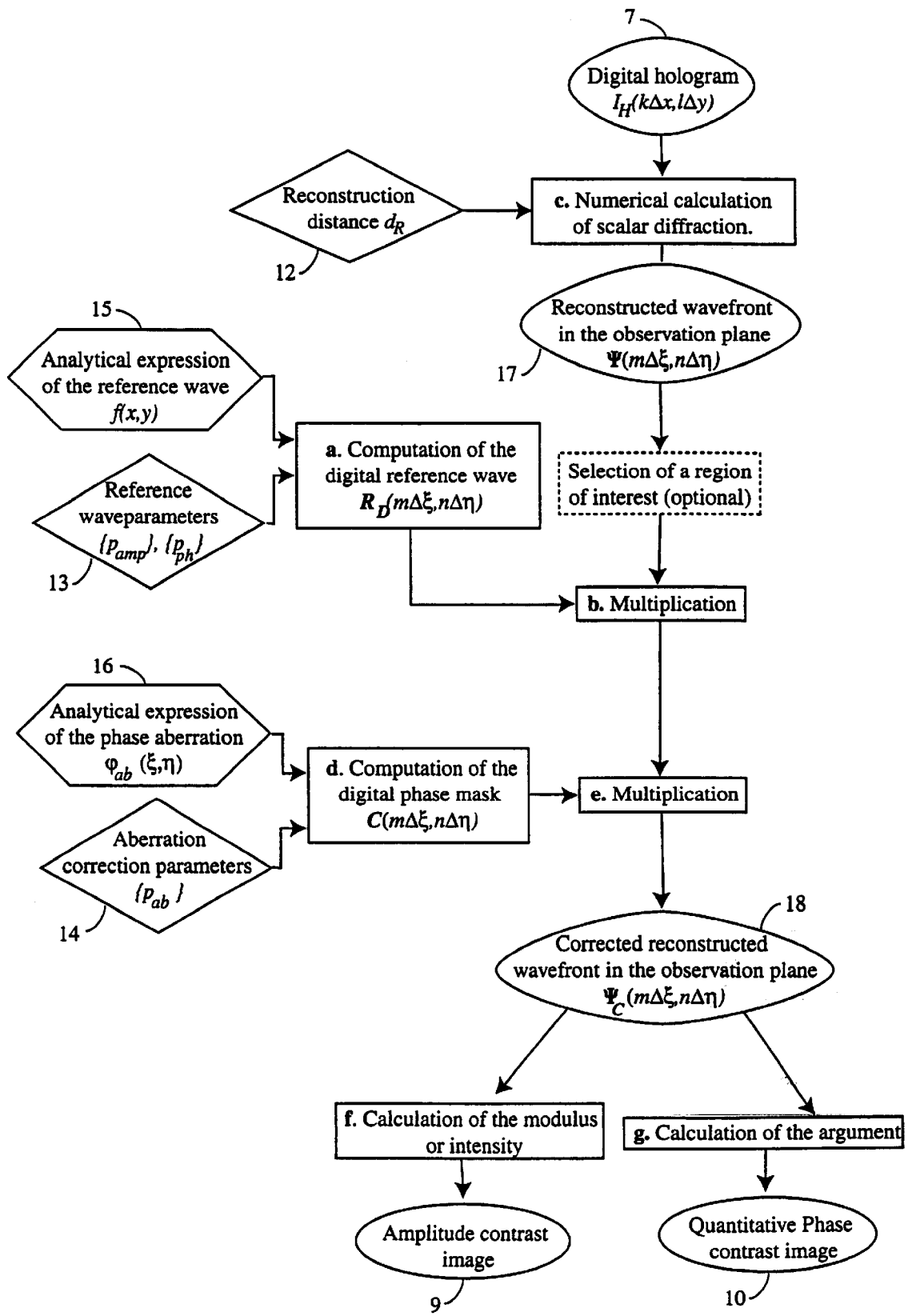
FIG. 5 is a view showing diagramatically an other possibility for the computation of the numerical method for the reconstruction of a digital hologram.

The present invention relates also to a numerical method for the hologram reconstruction which contains the same steps of computations as presented in FIG. 4, but with a different order of execution. For example, FIG. 5 presents an other possibility for the numerical reconstruction of a digital hologram 7. As shown in FIG. 5, the numerical calculation of scalar diffraction (step c.) is directly applied to the digital hologram $I_H(k\Delta x, l\Delta y)$ 7 and the obtained result (reconstructed wavefront in the observation plane $\Psi(m\Delta\xi, n\Delta\eta)$ 17 is multiplied by a digital reference wave in the observation plane $R_D(m\Delta\xi, n\Delta\eta)$. The digital reference wave is computed according the recipe explained in step a. However the analytical expression for the reference wave 15 and the reference wave parameters 13 can vary from FIG. 4 to FIG. 5. Then the other computation steps take place as for FIG. 4. The order of execution of the two multiplications (by the digital reference wave and by the digital phase mask) can be inverted. This procedure is more efficient, from the point of view of the computations, especially during the execution of the procedure for the adjustment of the reconstruction parameters.

If the hologram has been created in an off-axis geometry, the reconstructed wavefront in the observation plane $\Psi(m\Delta\xi, n\Delta\eta)$ 17 contains a zero order of diffraction, a twin image and a real image which are located-at different places of the observation plane (see FIG. 3). For this reason, the steps of computations after the diffraction calculation (after step c.), do not necessarily have to be performed for the entire image but only for a selected region of interest (see FIGS. 4 and 5) which contains the twin image or the real image.

The present invention relates also to a numerical reconstruction method which do not include all the ten steps of calculation as described above. For example, if phase contrast is not desired, the calculations which do not change the amplitude of the optical field in the observation plane (typically the digital correction of the phase aberration or the multiplication by a digital reference wave) can be suppressed.

As shown in FIG. 1, before the application of the numerical method for the hologram reconstruction, digital image processing methods, such as brightness and contrast adjustments, offset subtraction, band-pass filtering of the spatial frequencies in the Fourier plane, over or under-sampling of the digital hologram or other existing or further developed digital image processing methods can be optionally applied in order to improve the quality of the digital hologram 7. For example in order to enhance the fringe visibility or in order to improve the signal to noise ratio. Statistical calculations can also be applied to a set of acquired holograms. As also shown in FIG. 1, similar operations can also be optionally applied to the reconstructed images 9 and 10. In principle, even if it is not systematically presented in the figures, similar digital image processing treatment can be applied to all the computed images (digital reference wave, digital phase mask, transmitted wavefront in the hologram plane, reconstructed wavefront in the observation plane and corrected reconstructed wavefront in the observation plane).

In particular, if the hologram has been created in the off-axis geometry, the spatial frequencies are distributed principally at three different locations. The spatial frequencies corresponding to the non-interfering terms $|R|^2$ and $|O|^2$ (see Eq. (1)) are located in the center of the Fourier plane (low spatial frequencies) and the spatial frequencies corresponding to the interfering terms $R^*O$ and $RO^*$ (see Eq. (1)) are located at higher spatial frequencies, the position of which are related to the characteristics of the off-axis geometry. Before their numerical reconstruction, such off-axis holograms can be Fourier transformed and filtered in the Fourier domain in order to conserve only the spatial frequencies of the interfering terms. After the application of this filter, the hologram can be inverse Fourier transformed and numerically reconstructed.

If the digital hologram 7 is a digital Fresnel hologram, the numerical calculation of scalar diffraction (step c.) can be performed using a discrete formulation of the Fresnel integral. In this case, the algorithm for the numerical reconstruction of the digital hologram is given by Eq. (15):

$$\Psi(m\Delta\xi, n\Delta\eta) = C(m\Delta\xi, n\Delta\eta)A\exp\left\{\frac{i\pi}{\lambda d_R}[m^2\Delta\xi^2 + n^2\Delta\eta^2]\right\} \quad (15)$$

$$DFT\left[R_D(k\Delta x, l\Delta y)I_H(k\Delta x, l\Delta y)\exp\left\{\frac{i\pi}{\lambda d_R}[m^2\Delta x^2 + n^2\Delta y^2]\right\}\right]_{m,n}$$

where, $\lambda$ is the wavelength of the illumination source, $A=\exp(i2\pi d/\lambda)/(i\lambda d)$ is a complex constant, k,l,m,n are integers ($-N_x/2 \leq k,m \leq N_x/2$ and $-N_y/2 \leq n < N_y/2$) and DFT is the discrete Fourier transform operator. $\Delta x$ and $\Delta y$ are the sampling intervals in the hologram plane as defined by Eqs. (3) and (4). $d_R$ is the reconstruction distance 12. $C(m\Delta\xi, n\Delta\eta)$ is the digital phase mask and $R_D(k\Delta x, l\Delta y)$ is the digital reference wave.

In the Fresnel approximation, the sampling intervals in the observation plane $0\xi\eta$ are defined by $\Delta\xi$ and $\Delta\eta$. These intervals are related to the sampling intervals in the hologram plane ($\Delta x$ and $\Delta y$), to the number of samples (pixels) along both direction of the digital hologram ($N_x$ and $N_y$) and to the reconstruction distance ($d_R$) by the following relations:

$$\Delta\xi = \frac{\lambda d_R}{N_x \Delta x} = \frac{\lambda d_R}{L_x}, \quad (16)$$

$$\Delta\eta = \frac{\lambda d_R}{N_y \Delta y} = \frac{\lambda d_R}{L_y}. \quad (17)$$

Except for the multiplication by $C(m\Delta\xi, n\Delta\eta)$, the reconstruction algorithm as described by Eq. (15) can be understood as being a discrete calculation of the Fresnel integral or discrete Fresnel transform of the transmitted wavefront $\Psi(x,y)=R(x,y)I_H(x,y)$. As the calculation of the DFT can be performed with Fast Fourier Transform (FFT) algorithms, Eq. (15) can also be considered as being the expression of a fast Fresnel transform.

As already presented by FIG. 5, another implementation of the method can be obtained by computing directly the scalar diffraction pattern of the digital hologram $I_H(k\Delta x, l\Delta y)$ and by multiplying the obtained result by a digital reference wave in the observation plane. In this case, the reconstruction algorithm in the Fresnel approximation is given by:

$$\Psi(m\Delta\xi, n\Delta\eta) = \quad (18)$$

$$C(m\Delta\xi, n\Delta\eta)R_D(m\Delta\xi, n\Delta\eta)A\exp\left\{\frac{i\pi}{\lambda d_R}[m^2\Delta\xi^2 + n^2\Delta\eta^2]\right\}$$

$$DFT\left[I_H(k\Delta x, l\Delta y)\exp\left\{\frac{i\pi}{\lambda d_R}[m^2\Delta x^2 + n^2\Delta y^2]\right\}\right]_{m,n}$$

The term "digital Fresnel hologram" is to be understood as meaning that the numerical reconstruction of the hologram can be performed using one of the algorithms described by Eqs. (15) or (18).

As already mentioned, several reconstruction parameters 8 are required by the method for the numerical reconstruction of the hologram. With reference to FIGS. 4 and 5, three kinds of reconstruction parameters exist:

The reconstruction distance $d_R$ 12 represents the distance between the hologram plane 0xy and the observation plane $0\xi\eta$. The adjustment of the value of $d_R$ allows focusing of the reconstructed images. In order to obtain well focused reconstructed images, the value of the reconstruction distance must fit as well as possible the distance between the specimen and the plane where the hologram is created (for example we must have $d_R=d$, with d as defined in FIG. 2A and in FIG. 3). If dielectric media are introduced between the specimen and the hologram, $d_R$ must fit the optical path length between the specimen and the hologram. It is understood that the optical path length is defined by the quotient between the real distance and the refractive index of the dielectric media. If magnification (or demagnification) optics are used, the value of $d_R$ must fit the distance between the magnified (or demagnified) image and the plane where the hologram is created (for example we must have $d_R=d$, with d as defined in FIGS. 6A to 6C).

Figure 7A:
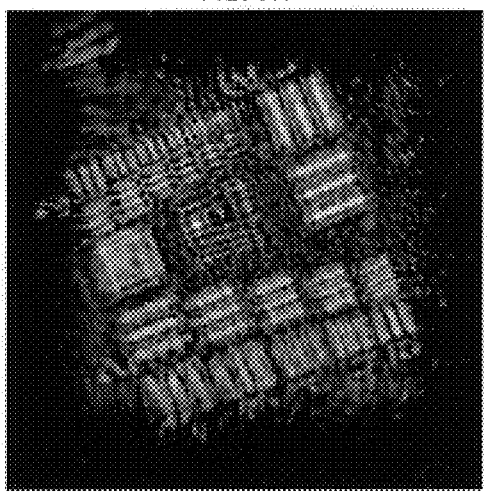
FIGS. 7A to 7C show three examples of numerically reconstructed amplitude contrast images of a USAF test target obtained with different reconstruction distances.
Figure 7B:
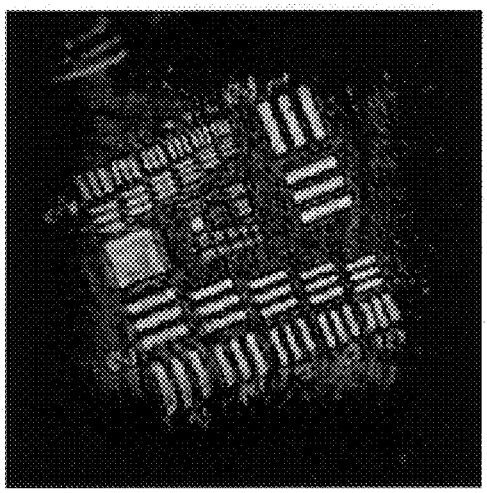
Figure 7C:
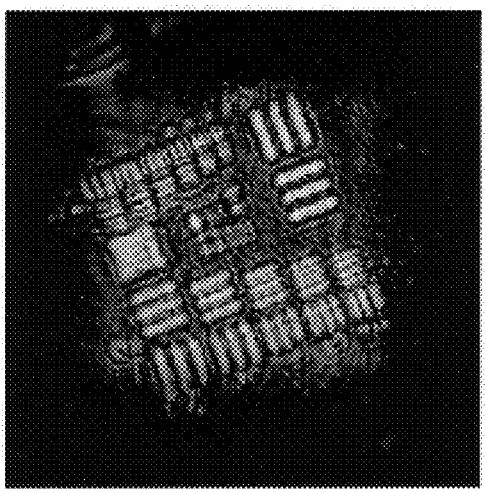

The adjustment of $d_R$ can be compared to the adjustment of the focalization in optical microscopy or in photography. In optical microscopy, the focalization is performed by translating the specimen along the optical axis of the microscope. In photography, the specimen is fixed and the focalization is performed by translating a lens along the optical axis of the imaging device. With the present invention, the same kind of operation can be performed digitally by adjusting the reconstruction distance $d_R$. FIG. 7 shows three amplitude contrast images of a USAF test target obtained with different values of the reconstruction distance and is presented here in order to illustrate the effect of digital focusing associated to the adjustment of $d_R$. FIG. 7A has been obtained for a too small value of $d_R$, FIG. 7B for the correct value of $d_R$ and FIG. 7C for a too large value.

With reference to FIG. 3, the sign of $d_R$ is important. If $d_R$ is positive the real image is in focus and if $d_R$ is negative, the observation plane is located behind the hologram and the twin image is in focus.

The reference wave parameters 13 are two sets of reconstruction parameters; $\{P_{amp}\}$ for the definition of the amplitude and $\{P_{pb}\}$ for the definition of the phase of the digital reference wave. The number of elements in these sets depends on the analytical expression of the reference wave 15. A precise adjustment of the reference wave parameters which defines the phase of the digital reference wave ($\{P_{pb}\}$) is important for quantitative phase contrast imaging. As explained above (see. Eq. (6) and related explications), the values of these parameters must be adjusted with precision in such a way that the wavefronts of the digital reference wave $R_D$ match as close as possible those of the experimental reference wave R (or those of its complex conjugate).

The aberration correction parameters 14 form a set of reconstruction parameters $\{P_{ab}\}$. The number of elements in this set depends on the analytical expression of the phase aberration 16. A precise adjustment of the aberration parameters is important for quantitative phase contrast imaging. The values of these parameters must be adjusted with precision in such a way that the multiplication of the reconstructed wavefront in the observation plane $\Psi(m\Delta\xi, n\Delta\eta)$ by the digital phase mask $C(m\Delta\xi,n\Delta\eta)$ corrects as well as possible the phase aberrations in the observation plane.

The expressions "fit as well as possible", "matches as close as possible" or "corrects as well as possible" are to be understood as meaning that the quality of the reconstructed images can be sufficient for a given application even if the reconstruction parameters are not exactly adjusted meaning that the computed digital reference wave and digital phase mask are not exact replicas of their experimental equivalents. The same remark is also valid for the definition of the analytical expressions of the reference wave and of the phase aberration. In other words, for the examples of the reconstruction distance and of the digital reference wave, the equalities $d=d_R$ and $R_D=R$ (digital reference wave=reference wave used for the hologram creation) are not strictly required to obtain a quantitative phase contrast image of the specimen but the required precision of this equality may vary from application to application, depending on the desired level of precision and image quality. The same kind of considerations is applicable to known situations in classical microscopy or in photography where, for example, the degree of precision of the focalizations of an image is limited by the quality of the optics and by the criteria (sometimes subjective) used to evaluate this focalization. Of course, an exact (or nearly exact) adjustment of the reconstruction parameters and the definition of exact analytical expressions is achievable with the present invention but may require the use of sophisticated models for the definitions of the analytical expressions with an increasing number of reconstruction parameters and, as a consequence, an increase of the computation time.

Figure 8A:
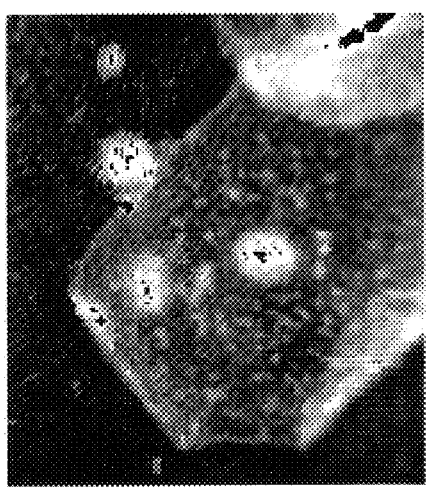
FIGS. 8A to 8C show examples of numerically reconstructed phase contrast images of a biological cell. For theses images, a plane wave has been used as reference for the hologram creation and a microscope objective has been used as magnification optics.

In a preferred manner, the adjustment of the reconstruction parameters which influence the quantitative phase contrast image (reference wave parameters and aberration correction parameters) is performed using an optically flat reference surface in and/or near or around the specimen. For example, this optically flat reference surface is a polished metallic or dielectric surface or a test pattern on which the specimen lies, typically a glass plate used as specimen holder as in classical microscopy. When such surface of known shape exists near the specimen, the reconstruction parameters can be adjusted in order to obtain the predicted phase distribution in the corresponding area of the reconstructed quantitative phase contrast image. For example, the reconstruction parameters will be adjusted in order to obtain a constant phase distribution if the reference surface is planar. FIG. 8A shows an example of reconstructed quantitative phase contrast image of a biological cell on a glass plate. With this example, the reconstruction parameters have been adjusted in order to obtain a constant phase distribution around the cell where only the glass plate which is flat and planar participate to the image formation. The case where the specimen is not lying on a to dielectric plate or on a mirror, but isolated in free space (supported, suspended or floating) can naturally also be considered.

Figure 8B:
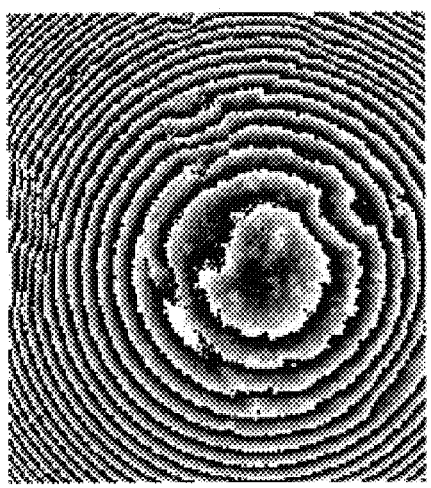
Figure 8C:
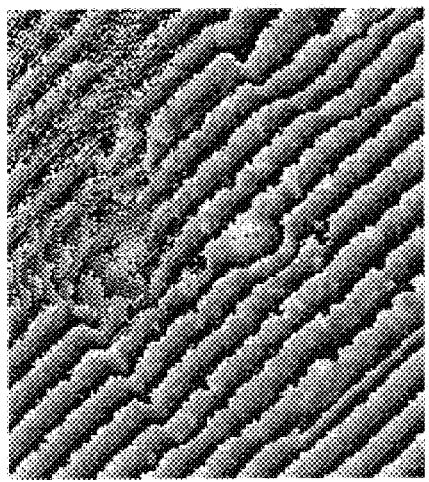

An illustration showing the effect a bad adjustment of the reference wave and aberration correction parameters is shown in FIG. 8. For this example, a plane wave has been used for the hologram recording and a microscope objective has been used as magnification optics, with a geometrical arrangement as shown in FIG. 6A. In this case, the digital reference wave $R_D(k\Delta x, l\Delta y)$ is computed using Eq. (8) with the reference wave parameters $A_R$, $k_x$ and $k_y$ and the digital phase mask $C(m\Delta\xi,n\Delta\eta)$ is computed using Eqs. (10) and (11) with the aberration correction parameter D. FIG. 8A shows the obtained quantitative phase contrast image with a correct adjustment of all reconstruction parameters ($d_R$, D, $k_x$, $k_y$ and $A_R$). The cell membrane, the nucleus and some intracellular structures are observable in this image. If the value of the aberration correction parameter D is modified with respect to its correct value, the obtained quantitative phase contrast image which is shown in FIG. 8B. In this case, we observe that curved concentric fringes, which are characteristic of the quadratic phase aberration of the microscope objective, appear on the image. These curved fringes appear when the phase difference between the computed digital phase mask $C(m\Delta\xi,n\Delta\eta)$ and the complex conjugate of the phase aberrations function of the microscope objective (experimental phase aberration) is equal to a multiple of $2\pi$. The value of D is adjusted in order to minimize the curvature of these fringes. If D is correctly adjusted, but the values of the reference wave parameter $k_x$ and $k_y$ are modified, we observe in FIG. 8C, that straight fringes with a fixed orientation and spacing appear on the obtained quantitative phase contrast image. These straight fringes appear when the phase difference between the wavefronts of $R_D(k\Delta x, l\Delta y)$ and the wavefronts of the experimental reference plane wave $R(x,y)$ (or the wavefronts of its complex conjugate) is equal to a multiple of $2\pi$. The values of $k_x$ and $k_y$ are adjusted in order to maximize the distance between two adjacent fringes. When no more fringes appear on the reconstructed images, a finer adjustment of $k_x$ and $k_y$ is performed in order to suppress residual constant gradients in the reconstructed phase distribution.

If the reference wave is spherical (or nearly spherical), a bad adjustment of the is reference wave parameters will produce curved fringes on the phase contrast image and the reference wave parameters are adjusted in order to eliminate these fringes. In this case a finer adjustment of the reconstruction parameters is performed in order to suppress residual constant curvatures of the reconstructed phase distribution.

Figure 9:
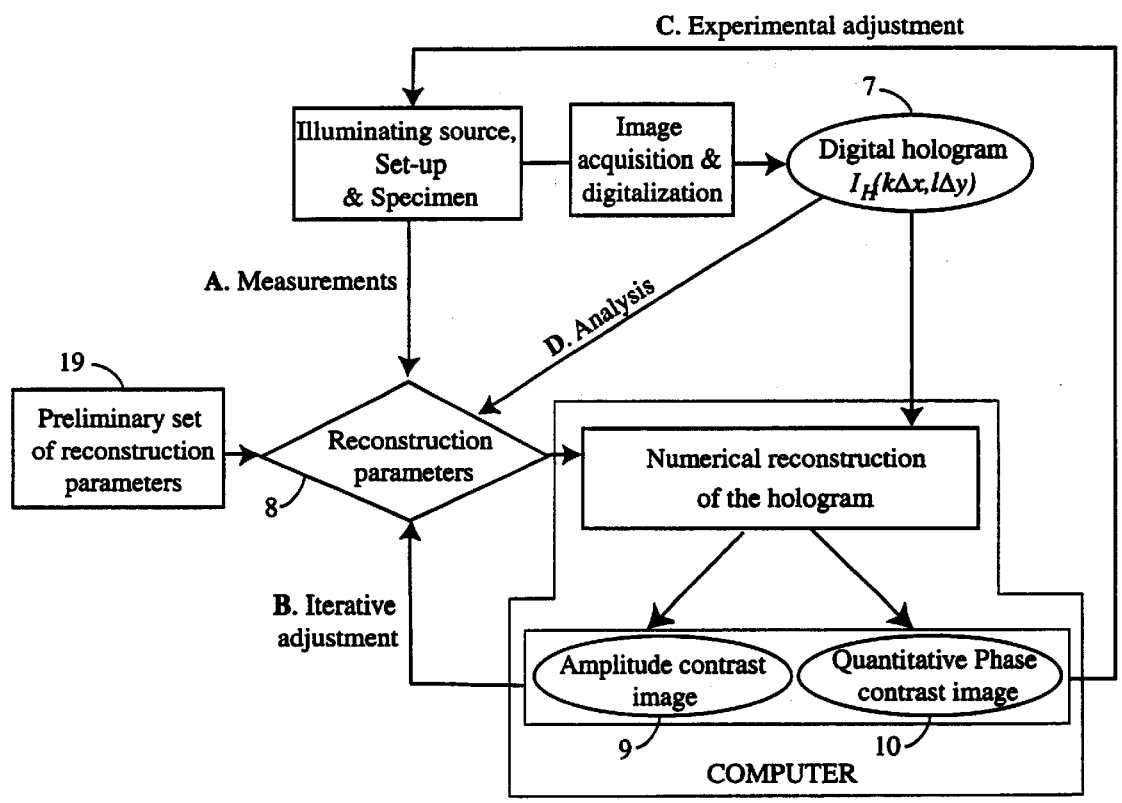
FIG. 9 is a view showing diagrammatically the different possibilities for the adjustment of the values of the reconstruction parameters.

As shown in FIG. 9, four different procedures are possible for the adjustment of the correct values of the reconstruction parameters (a combination of these different procedures is also possible):

A. Measurement of the reconstruction parameters: As the reconstruction parameters have a physical meaning (distances, angles, light intensities), their values can be measured on the set-up. This measurement can be performed by an apparatus which communicates with the computer. For example, in a set-up without magnification or demagnification optics the distance between the specimen and the plane where the hologram is created (d in FIG. 2A) can be measured and the obtained value can be used as reconstruction distance $d_R$.

B. Iterative adjustment: The adjustment of the reconstruction parameters can be performed interactively by executing several times the numerical reconstruction of the same digital hologram in a loop. At the end of each iteration (each numerical reconstruction), the obtained amplitude and phase contrast images are analyzed and the values of the reconstruction parameters are modified. The reconstructed images obtained for this new set of reconstruction parameters are compared with the images obtained at the end of the previous iteration and the values of the reconstruction parameters are modified in order to improve the image quality. This loop is repeated until the values of the reconstruction parameters reach their optimal values. This operation can be performed by a human operator or automatically by a computer on the basis of a numerical method. For example, the adjustment of the reconstruction distance can be performed using an auto focus method which automatically maximize the high frequency content of the reconstructed image. Known focus criterion such as the so-called variation of intensity, sum modulus difference (SMD), entropy of gray levels or square plane sum modulus difference (SPSMD) can be used to evaluate quantitatively the focalization of the reconstructed images. The application of a Sobel or Prewitt filter to the reconstructed image followed by an integration can also be used as focus criterion which must be maximized.

Similar automatic methods can be used for the adjustment of the reference wave or aberration correction parameters.

C. Experimental adjustment: It is also possible to perform the numerical reconstruction of the acquired digital holograms with fixed values of the reconstruction parameters and to modify the experimental configuration used for the hologram recording by translating and/or rotating the specimen and/or the components of the set-up. For example, the reconstruction of the digital hologram can be performed with a fixed value of the reconstruction distance $d_R$ and the specimen can be moved away from or closer to the plane where the hologram is created until the reconstructed images are in focus. If the experimental set-up comprises a magnification or a demagnification optics, the focalization of the reconstructed images can be performed as usually in classical microscopy or in classical photography by translating the specimen and/or the magnification or demagnification optics along the optical axis of the imaging system. If the reference wave is reflected by a mirror towards the plane where the hologram is created (as shown for example in FIGS. 2A and 2B), the adjustment the reference wave parameters can be performed by rotating and/or translating the mirror. If magnification optics or demagnification optics are used, because the phase aberration function in the observation plane depends generally on the distance between the specimen and the magnification optics, the adjustment of the phase aberration parameters can be performed by translating the specimen and/or the magnification or demagnification optics along the optical axis of the imaging system.

This experimental adjustment of the reconstruction parameters can be performed by a human operator or by an apparatus such as piezoelectric driven actuators or translators. If an apparatus is used and if this apparatus is controlled by a computer or by a processor, this experimental adjustment of the reconstruction parameters can be performed automatically using an iterative method. For example, focused images can be obtained using an auto focus method which controls the translation of the specimen or the translation of the magnification or demagnification optics.

D. Analysis of the digital hologram: The hologram itself contains information about the experimental configuration which has been used for the hologram creation and the digital hologram can be analyzed in order to estimate the values of the reconstruction parameters. For example, the digital hologram can be Fourier transformed and the distribution of spatial frequencies can be analyzed. In particular, if the hologram has been created in the off-axis geometry, the spatial frequencies are distributed principally at three different locations. The spatial frequencies corresponding to the non-interfering terms $|R|^2$ and $|O|^2$ (see Eq. (1)) are located in the center of the Fourier plane (low spatial frequencies) and the spatial frequencies corresponding to the interfering terms R*O and RO* (see Eq. (1)) are located at higher spatial frequencies, the position of which are related to the characteristics of the off-axis geometry. For example, if the hologram has been recorded in the off-axis geometry with a plane wave as reference, the values of the reference wave parameters $k_x$ and $k_y$ (see. Eq. (8)) can be estimated from the distribution of spatial frequencies in the Fourier domain.

Generally, a first numerical reconstruction of the digital hologram is performed using a preliminary set of reconstruction parameters 19 with default values and the adjustment of the reconstruction parameters is performed using a combination of the procedures A, B, C and D as described above.

The above mentioned methods for the adjustment of the reconstruction parameters assume that the digital reference wave and the digital phase mask are computed on the basis of known analytical expressions. It is also possible to evaluate the digital reference wave and the digital phase mask experimentally using a specimen of known phase distribution. For example, if an optically flat surface (e.g. a mirror) is used as specimen, a constant reconstructed phase distribution is attempted. If the numerical reconstruction of the hologram is performed without correction of the phase aberration and without multiplication by a digital reference wave, the reconstructed phase distribution will be the result of three contributions: the attempted constant (specimen contribution), the phase aberration (magnification optics contribution) and the phase of the reference wave in the observation plane (reference wave contribution). By subtraction the constant contribution of the specimen, one can obtain the phase of both the digital reference wave and the digital phase mask. An array of complex numbers can be formed with this phase information and the multiplication of the obtained result by the complex conjugate of this array allows for the recovery of the phase of the specimen.

FIG. 10 shows six examples of numerical reconstruction of digital holograms and is presented here in order to clarify the idea of simultaneous amplitude and quantitative phase contrasts imaging. FIGS. 10A and 10B present respectively the amplitude contrast image and the quantitative phase contrast image of a USAF test target. The hologram has been recorded in the reflection geometry (the object wave is reflected by the specimen). The specimen (USAF test target) is composed of a glass plate on which rectangular reflective elements of several sizes are created by chromium evaporation. In amplitude contrast (FIG. 10A), the obtained image reveals changes of the reflectance of the specimen, and in quantitative phase contrast (FIG. 10B), the obtained image reveals changes of both the topography of the specimen and the optical phase shift at the reflection on the surface. Both amplitude and quantitative phase contrast images reveal the same pattern because the highest parts of the specimen are also the most reflective.

Figure 10A:
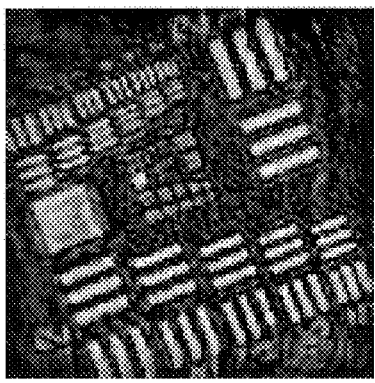
FIGS. 10A to 10F show examples of simultaneously reconstructed amplitude and quantitative phase contrast images.
Figure 10B:
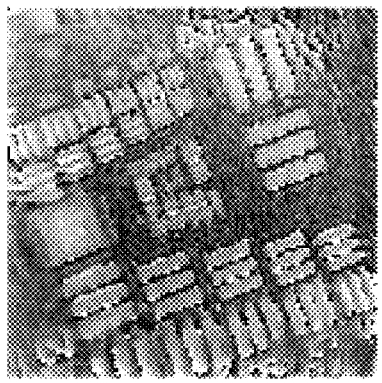
Figure 10C:
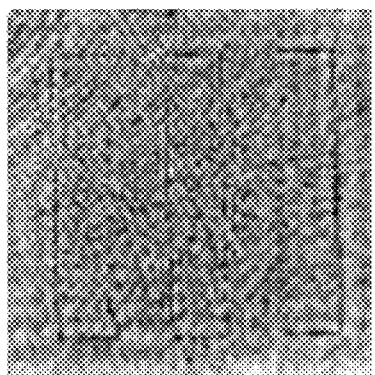
Figure 10D:
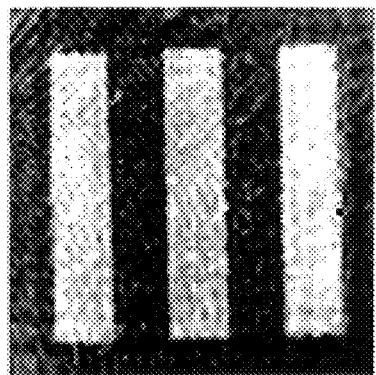

FIGS. 10C and 10D present respectively the amplitude contrast image and the quantitative phase contrast image of a pure phase object. The hologram has been recorded in the reflection geometry. The specimen has been fabricated by evaporating a thin layer of aluminum (70 nm) over the surface of a USAF test target. In amplitude (FIG. 10C), no contrast is observable because the optical properties are the same over the whole surface of the specimen, and in quantitative phase contrast (FIG. 10D), the obtained image reveals exclusively the topography of the specimen.

Figure 10E:
Figure 10F:
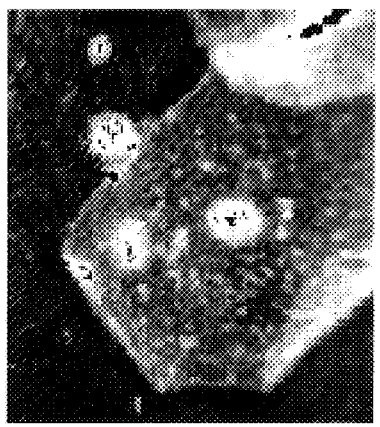

FIGS. 10E and 10F present respectively the amplitude contrast image and the quantitative phase contrast image of a biological cell. The hologram has been recorded in the transmission geometry (the object wave is created by the light that is transmitted by the specimen). As biological cells are almost transparent, the reconstructed image in amplitude contrast (FIG. 10E) reveals less details than the quantitative phase contrast image (FIG. 10F), the contrast of which is due to differences in the refractive index and/or in the thickness of the specimen.

Figure 11A:
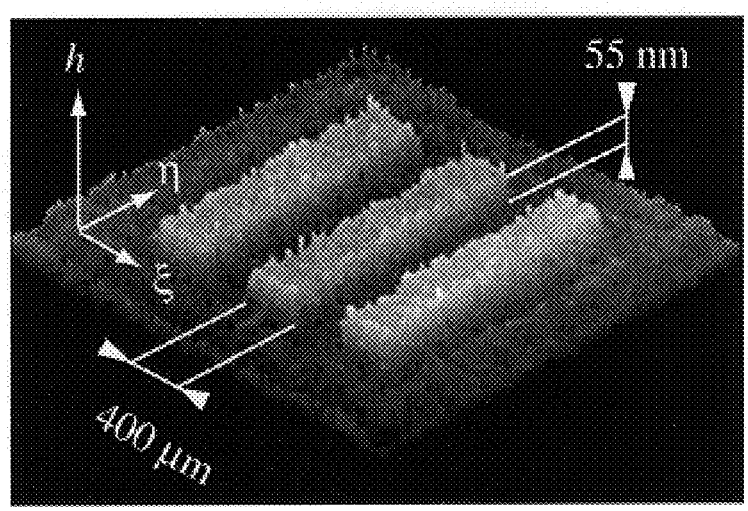
FIG. 11A is a three-dimensional perspective of a numerically reconstructed phase distribution to show the topography of a pure phase object.

FIG. 11 is presented here in order to clarify the idea of quantitative phase contrast and shows an example of quantitative measurement performed with the present invention. FIG. 11A shows a view in a three-dimensional perspective of the phase contrast image presented in FIG. 10D. As the specimen is a pure phase object, the reconstructed phase distribution $\Phi(\xi,\eta)$ is directly proportional the height distribution $h(\xi\eta)$ on the sample surface (topography of the specimen):

$$h(\xi, \eta) = \frac{\lambda}{4\pi} \Phi(\xi, \eta). \tag{19}$$

Figure 11B:
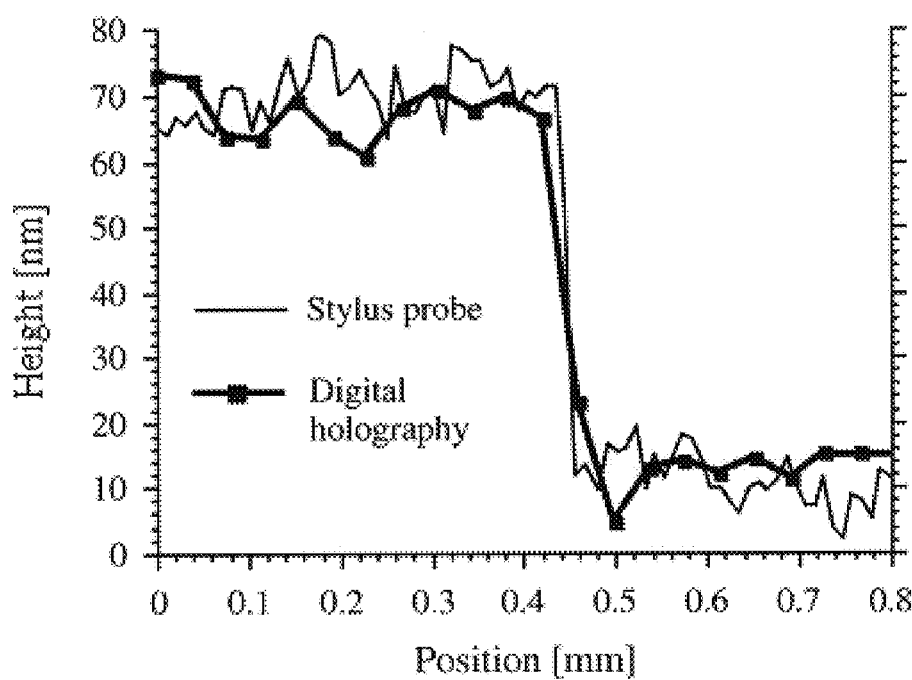
FIG. 11B is a graph to show an example of quantitative measurement (profilometry) with quantitative phase contrast imaging.

FIG. 11B is a graph to show an example of quantitative surface profilometry. A phase profile has been extracted from the data corresponding to the image presented in FIG. 11A. The measured phase values have been converted to height measurements using Eq. (19) and reported on the graph of FIG. 11B, the corresponding profile is referred as "Digital holography" and gives a measurement of about 55 nanometers (nm) for the step height. For comparison, the same step height has been measured by scanning a standard contact stylus probe profilometer (Alpha-step 500) over the corresponding area of the sample. As shown in FIG. 11B, both techniques are in excellent agreement.

With the present invention, a set of holograms (at least two) of the same specimen or of several different specimens can be recorded, acquired, digitized and numerically reconstructed using the various above described methods. It is also clear that each individual hologram can be the hologram of many specimens at the same time or in other words that the specimen can be composed of several specimens.

For example, this set of holograms can be a time sequence of holograms which have been created, with the same or with an other specimen, at different instants. The corresponding numerically reconstructed amplitude and/or quantitative phase contrast set of images represent then the specimen (or the different specimens) at these different instants and this set of reconstructed images can be used in order to build a computed video animation and/or in order to monitor a deformation of the specimen and/or a movement of the specimen and/or a modification of the optical properties of the specimen.

For example, this set of holograms may contain holograms of the same specimen which have been recorded at the same instant using several image acquisition systems and an appropriate set-up. The corresponding reconstructed images represent the specimen with different direction of observations.

For example, this set of holograms may contain holograms which have been created in the transmission geometry, for different orientations of a semi-transparent or transparent specimen. For example, the specimen can be rotated between each hologram acquisition. Then, the well-known Fourier slice theorem can be applied to the set of corresponding numerically reconstructed amplitude and/or quantitative phase contrast set of images which are considered as the projections of the specimen along the optical path way. Back-projections techniques are also appropriate for the reconstruction. In a more developed version of the method, diffraction tomography is a known approach which can be applied to the treatment of the set of reconstructed images in order to build a computed three-dimensional tomography of the specimen.

Another method resulting from the present invention is based on the treatment of a set of holograms obtained after successive modifications of the irradiation wavelength $\lambda$. If the holograms are recorded in the transmission geometry with a semi transparent specimen, and provided that the dispersion law of the refractive index is known, the exact thickness of the specimen can be derived.

Another method resulting from the present invention is based on the treatment of a set of holograms obtained after successive modifications of the irradiation wavelength $\lambda$. A computed three dimensional description of the specimen can be obtained from the Fourier transform of the set of corresponding reconstructed amplitude and quantitative phase contrast images regularly sampled at wavevectors k obtained by changing the wavelength. If the set of holograms is recorded in the Fourier configuration, the three-dimensional reconstruction of the specimen can be performed using a three dimensional Fourier transform. If the set of holograms contains Fresnel holograms, the three-dimensional reconstruction of the specimen can be performed using Fourier transform along the direction of the optical axis and a Fresnel transform in the transverse planes.

The present invention can also be used to reconstruct a hologram which results from the interference between an object wave and more than one reference waves. For example, the different reference waves can correspond to different off-axis configurations and the corresponding reconstructed images will appear at different locations of the observation plane.

For example, the hologram can be created using two reference waves with crossed polarizations and with different directions of propagation. For example, a Wollaston prism can be used to perform this separation in direction and polarization. In this case, two reconstructed images corresponding to the crossed polarization can be observed separately and used to measure the birefringence and the dichroism of the specimen.

The present invention can also be used to reconstruct a hologram which results from the interference between one reference wave and more than one object waves.

The present invention can also be used to reconstruct a hologram which results from the interference between more than one reference wave and more than one object wave. In other words, the present invention can be applied to reconstruct a hologram which can be expressed as follow:

$$I_H = \left(\sum_i R_i + \sum_j O_j\right)\left(\sum_i R_i + \sum_j O_j\right)^*, \quad (20)$$

where i and j are integers (i,j≧1). The reconstruction of such holograms produces several images which can be reconstructed separately with different values of the reconstruction parameters.

If the direction of propagation of the reference wave is changed synchronously with a modification of the object wavefront in a time sequence shorter than the hologram acquisition time, monitoring of object changes is possible with only one hologram acquisition.

Figure 12B:
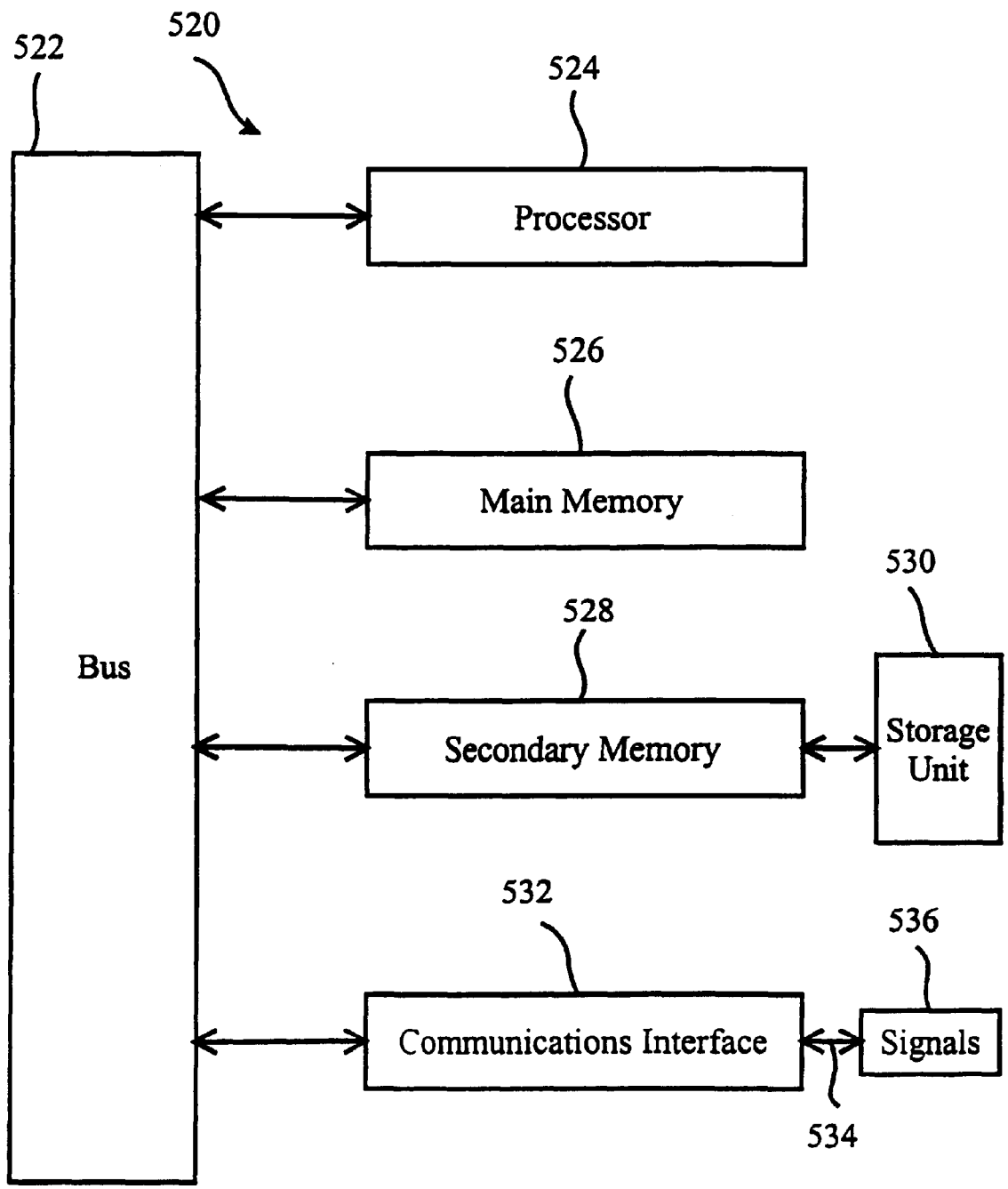
FIG. 12B illustrates an exemplary portion of a generalized hardware configuration, in the format of a workstation, upon which portions of the invention may be implemented.

FIG. 12a illustrates an exemplary portion of a generalized computer system 500 upon which portions of the invention may be implemented. For example, the configurations illustrated in FIGS. 1–3 and 5–6 may each be implemented by a plurality of computers having a generalized configuration as exemplified by FIG. 12a or by a plurality of computers having configurations similar to those of FIGS. 12a and 12b described below.

An input 502 of FIG. 12a communicates with a memory 504 and a Central Processing Unit 508. The Central Processing Unit 508 communicates with the memory 504 and an output 506. The output 506 is also in communication with the memory 504. The Central Processing Unit 508 may include an arithmetic/logic unit and a control unit in the form of hardware and/or software (not shown). One or more of inputs 502 may each be in communication with one or more memories 504 and/or Central Processing Units 508. One or more Central Processing Units 508 may be in communication with one or more outputs 506 and/or memories 504 and/or inputs 502. One or more memories 504 may be in communication with one or more inputs 502 and/or Central Processing Units 508 and/or outputs 506. Clearly, a plurality of variations of computer hardware configurations may be realized in a network of computer systems upon which portions of the invention may be implemented.

FIG. 12b illustrates an exemplary hardware configuration of a generalized computer system 520 upon which portions of the invention may be implemented. One or more processors 524 are connected to a communication bus 522. The communication bus 522 also communicates with a main memory 526, preferably a random access memory ("RAM"). A secondary memory 528 communicating with the communication bus 522 may also be included in the computer system 520. The secondary memory 520 may include, for example, a hard disk drive, a removable storage drive such as a floppy disk drive, a magnetic tape drive, an optical disk drive, a program cartridge and cartridge interface, a removable memory chip (e.g., EPROM, PROM, ROM), or any other similar storage medium. The secondary memory 528 may be in communication with a storage unit 530 such as a floppy disk, magnetic tape, optical disk, or other storage medium read by and written to by a secondary memory device. The storage unit 530 includes a computer usable storage medium for storing computer software and data.

The computer system 520 may also include a communications interface 532 in communication with the communication bus 522 for transferring software and data between the computer system 520 and external devices. Examples of communications interfaces 532 include a modem, a network interface (e.g., a network card), a communications port, a PCMCIA slot and card, and other similar interfaces. Software and data transferred via the communications interface 532 are in the form of signals 536 which are provided to the communications interface 532 via a channel 534. The signals 536 may be electronic, electromagnetic, optical or other signals capable of being received by the communications interface 532. The channel 534 may be implemented using wire, cable, fiber optics, a phone line, a cellular phone link, a RF link, an IR link or other communications channels.

Computer programs are stored in main memory 526 and/or secondary memory 528. Computer programs may be received via the communications interface 532. Computer programs, when executed by the processor 524, enable the computer system 520 to perform the features of the present invention.

This invention may be conveniently implemented using a network of conventional general purpose digital computers and/or microprocessors programmed according to the teachings of the present specification, as will be apparent to those skilled in the computer art from reading the above descriptions regarding FIGS. 1–12b. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed as new and desired to be secured by letters patent of the United States is:

1. A method for simultaneous amplitude and quantitative phase contrast imaging of a specimen by numerical reconstruction of a digital hologram of the specimen comprising the following steps:

a) providing a hologram of the specimen using an illumination source, wherein the hologram of the specimen results from interference between two waves issued from the illumination source, one of the two waves, named an object wave, having interacted with the specimen, and another of the two waves, called a reference wave, having not interacted with the specimen;

b) acquiring an image of the hologram by an image acquisition system;

c) digitizing the image of the hologram by an image digitizer in order to produce the digital hologram;

d) transmitting the digital hologram to a computer or to a processor;

e) determining and defining an analytical expression of the reference wave and determining and defining a first group of reconstruction parameters as reference wave parameters;

f) computing a first array of complex numbers as a digital reference wave, wherein said computing the first array of complex numbers step is performed on a basis of the analytical expression of the reference wave and on a basis of the reference wave parameters;

g) computing a multiplication of the digital hologram and the digital reference wave in order to create a digital transmitted wavefront in a hologram plane;

h) determining and defining a second group of reconstruction parameters as a reconstruction distance;

i) computing a propagation of the digital transmitted wavefront from the hologram plane to an observation plane in order to calculate a digital reconstructed wavefront in the observation plane wherein said computing the propagation of the digital transmitted wavefront step is performed by a numerical calculation of an integral describing a diffraction of waves in a scalar approximation and wherein a distance between the hologram plane and the observation plane is defined by the reconstruction distance;

j) determining and defining an analytical expression of a phase aberration and determining and defining a third group of reconstruction parameters as aberration correction parameters;

k) computing a second array of complex numbers as a digital phase mask which represents a complex conjugate of a phase aberration function in the observation plane, said computing the second array of complex numbers step being performed on a basis of the analytical expression of the phase aberration and on a basis of the aberration correction parameters;

l) digitally correcting the phase aberration by computation of multiplication between the digital reconstructed wavefront in the observation plane and the digital phase mask in order to obtain a digital corrected reconstructed wavefront in the observation plane;

m) computing square of a modulus of the digital corrected reconstructed wavefront in the observation plane in order to obtain an amplitude contrast image of the specimen;

n) computing an argument of the digital corrected reconstructed wavefront in the observation plane in order to obtain a quantitative phase contrast image of the specimen; and o) adjusting the reconstruction parameters comprising adjusting of:
   the reconstruction distance, the reference wave parameters, and the aberration correction parameters.

2. A method for simultaneous amplitude and quantitative phase contrast imaging of a specimen by numerical reconstruction of a digital hologram of the specimen comprising the following steps:

a) providing a hologram of the specimen using an illumination source, wherein the hologram of the specimen results from interference between two waves issued from the illumination source, one of the two waves, named an object wave, having interacted with the specimen, and another of the two waves, called a reference wave, having not interacted with the specimen;

b) acquiring an image of the hologram by an image acquisition system;

c) digitizing the image of the hologram by an image digitizer in order to produce the digital hologram;

d) transmitting the digital hologram to a computer or to a processor;

e) determining and defining a first group of reconstruction parameters as a reconstruction distance;

f) computing a digital reconstructed wavefront in an observation plane by computation of a diffraction pattern of the digital hologram, wherein said computing the digital reconstructed wavefront step is performed by a numerical calculation of an integral describing a diffraction of waves in a scalar approximation and wherein a distance between a hologram plane and the observation plane is given by the reconstruction distance;

g) determining and defining an analytical expression of the reference wave and determining and defining a second group of reconstruction parameters as reference wave parameters;

h) computing a first array of complex numbers as a digital reference wave, wherein said computing the first array of complex numbers step is performed on a basis of the analytical expression of the reference wave and on a basis of the reference wave parameters;

i) computing a multiplication of the digital reconstructed wavefront in the observation plane and the digital reference wave in order to correct a phase distortion induced by the reference wave in the observation plane to provide a digital corrected reconstructed wavefront in the observation plane;

j) determining and defining an analytical expression of a phase aberration and determining and defining a third group of reconstruction parameters as aberration correction parameters;

k) computing a second array of complex numbers as a digital phase mask which represents a complex conjugate of a phase aberration function in the observation plane, said computing the second array of complex numbers step being performed on a basis of the analytical expression of the phase aberration and on a basis of the aberration correction parameters;

l) digitally correcting the phase aberration by computation of multiplication between the digital reconstructed wavefront in the observation plane and the digital phase mask in order to obtain the digital corrected reconstructed wavefront in the observation plane;

m) computing a square of a modulus of the digital corrected reconstructed wavefront in the observation plane in order to obtain an amplitude contrast image of the specimen;

n) computing an argument of the digital corrected reconstructed wavefront in the observation plane in order to obtain a quantitative phase contrast image of the specimen; and o) adjusting the reconstruction parameters comprising adjusting of:
   the reconstruction distance, the reference wave parameters, and the aberration correction parameters.

3. A method according to claims 1 or 2 wherein said reconstruction parameters comprise a set of constants being supplied to a first program which executes the numerical reconstruction of the digital hologram and wherein said constants are supplied to the computer which executes the first program by one of inputting by a human operator the reconstruction parameters and initiating by the human operator execution of the first program, inputting by a measuring apparatus the reconstruction parameters and initiating by the measuring apparatus execution of the first program, and inputting by a second program the reconstruction parameters and initiating by the second program execution of the first program.

4. A method according to claims 1 or 2 wherein said hologram is provided by an off-axis hologram, wherein directions of propagation of the reference and object waves are not parallel at incidences of the reference and object waves on plane where the hologram is created, whereby an acquisition and reconstruction of the off-axis hologram allows a separation of a zero order of diffraction of a twin image and a real image which can be observed separately in the observation plane.

5. A method according to claims 1 or 2 wherein said hologram is an off-axis hologram and wherein said digital hologram is processed, before said step 3), by an image processing method comprising the steps of:
   computing a two dimensional discrete Fourier transform of the digital hologram;
   locating, in the two dimensional discrete Fourier transform of the digital hologram, spatial frequencies which correspond to at least one of a real image and a twin image;
   computing a multiplication of the two dimensional discrete Fourier transform of the digital hologram by a 2D function which eliminates or attenuates the spatial frequencies that correspond with at least one of the real image and the twin image; and
   computing a discrete inverse Fourier transform.

6. A method according to claims 1 or 2 wherein said hologram is spatially filtered by applying an optical method, including a 4-f system and a mask designed for high-pass filtering.

7. A method according to claims 1 or 2 wherein said integral describing the diffraction of waves in the scalar approximation is a Fresnel-Kirchhoff integral, a Rayleigh-Sommerfeld integral, a Fresnel integral or an approximation of the Fresnel-Kirchhoff integral, the Rayleigh-Sommerfeld integral, or the Fresnel integral.

8. A method according to claims 1 or 2 wherein said numerical calculation of the integral describing the diffraction of waves in the scalar approximation is performed by a numerical calculation of a discrete formulation of a Fresnel integral called a discrete Fresnel transform which is computed using the following equations:

$$\left[ F(m\Delta\xi, n\Delta\eta) = A\exp\left\{ \frac{i\pi}{\lambda d_R}[m^2\Delta x^2 + n^2\Delta y^2]\right\}\right.$$
$$\left. DFT\left[ f(k\Delta x, l\Delta y)\exp\left\{ \frac{i\pi}{\lambda d_R}[m^2\Delta\xi^2 + n^2\Delta\eta^2]\right\}\right]_{m,n}\right]$$

$$F(m\Delta\xi, n\Delta\eta) = A\exp\left\{ \frac{i\pi}{\lambda d_R}[m^2\Delta\xi^2 + n^2\Delta\eta^2]\right\}$$
$$DFT\left[ f(k\Delta x, l\Delta y)\exp\left\{ \frac{i\pi}{\lambda d_R}[m^2\Delta x^2 + n^2\Delta y^2]\right\}\right]_{m,n}$$

where $F(m\Delta\xi, n\Delta\eta)$ denotes the discrete Fresnel transform of a discrete function $f(k\Delta x, l\Delta y)$ and is a third array of complex numbers, $f(k\Delta x, l\Delta y)$ is a fourth array of complex numbers or an array of real or integer numbers, $\lambda$ is a wavelength of the illumination source, $d_R$ is the reconstruction distance, $A=\exp(i2\pi/\lambda)/(i\lambda d_R)$ is a complex constant and k,l,m,n are integers, $-N_x/2 \leq k, m \leq N_x/2,$ $-N_x/2 \leq l, n \leq N_y/2,$ where a product $N_x \times N_y$ represents a number of elements of $F(m\Delta\xi, n\Delta\eta)$ and of $f(k\Delta x, l\Delta y)$, DFT is a discrete Fourier transform operator which is calculated using a Fast Fourier Transform (FFT) algorithm, $\Delta x$ and $\Delta y$ are sampling intervals in the hologram plane and, when the image acquisition system and said image digitizer produce a rectangular image, $N_x$ lines along an Ox axis and $N_y$ lines along an Oy axis are contained in the rectangular image, and $$\Delta x = \frac{L_x}{N_x},$$

$$\Delta y = \frac{L_y}{N_y},$$

where $L_x$ and $L_y$ are dimensions of the digital hologram along respectively the Ox and the Oy axis, and wherein sampling intervals in the observation plane $0\xi\eta$) are defined by $\Delta\xi$ and $\Delta\eta$, said sampling intervals in the observation plane being related to $\Delta x$ and $\Delta y$, to $N_x$ and $N_y$ and to the reconstruction distance by the following relations:

$$\Delta\xi = \frac{\lambda d_R}{N_x \Delta x} = \frac{\lambda d_R}{L_x},$$

$$\Delta\eta = \frac{\lambda d_R}{N_y \Delta y} = \frac{\lambda d_R}{y}.$$

9. A method according to claims 1 or 2 wherein said hologram is provided by a set-up which provides a Fresnel hologram wherein the numerical calculation of the integral describing the diffraction of waves in the scalar approximation is performed by numerical calculation of a Fresnel transform.

10. A method according to claims 1 or 2 wherein said hologram is provided by a set-up which produces Fourier holograms and wherein said numerical calculation of the integral describing the diffraction of waves in the scalar approximation is performed by a Fourier transformation.

11. A method according to claims 1 or 2 wherein said illumination source produces at least one of electromagnetic radiation and a photon density wave and one of an acoustic wave, a mechanical wave and a pressure wave.

12. A method according to claims 1 or 2 wherein said reference wave is provided by a device which allows an adjustment of a length of a path of the reference wave.

13. A method according to claims 1 or 2 wherein the object wave is produced by an assembly of optics components which produces a magnified or a demagnified image of the specimen.

14. A method according to claims 1 or 2 wherein said acquiring the image of the hologram is performed after transmission of the hologram through space, by one or more lenses or with an endoscope constituted of at least one of Hopkins relay optics and gradient index rods and optical fibers and bundles of the optical fibers and multicore fibers.

15. A method according to claims 1 or 2 wherein said image digitizer is an apparatus which transforms the image of the hologram into a form which can be transmitted to said computer or mid processor.

16. A method according to claims 1 or 2 wherein said analytical expression of the reference wave is a two-dimensional complex function.

17. A method according to claims 1 or 2 wherein said reference wave parameters are parameters which are involved in the analytical expression of the reference wave and are used for a definition of the digital reference wave.

18. A method according to claims 1 or 2 wherein, if said reference wave is a plane wave of given wavelength λ, the digital reference wave $R_D(k\Delta x, l\Delta y)$ is computed using the following expression:

$$R_D(k\Delta x, l\Delta y) = A_R \exp\left(i\frac{2\pi}{\lambda}(k_x k\Delta x + k_y l\Delta y)\right),$$

where $k_x$, $k_y$ and $A_R$ are the reference wave parameters K and k, are two real numbers which represent components of a normalized wavevector, a direction of propagation of the plane wave, $A_R$ is a third real number which represents an amplitude of the reference wave, k, l are integers and $\Delta x$ and $\Delta y$ are sampling intervals in the hologram plane.

19. A method according to claims 1 or 2 wherein, if said reference wave is a spherical wave of given wavelength λ, the digital reference wave $R_D(k\Delta x, l\Delta y)$ is computed using the following expression:

$$R_D(k\Delta x, l\Delta y) = \frac{A_R}{\sqrt{(k\Delta x - x_R)^2 + (l\Delta y - y_R)^2 + z_R^2}} \exp\left(i\frac{2\pi}{\lambda}\sqrt{(k\Delta x - x_R)^2 + (l\Delta y - y_R)^2 + z_R^2}\right),$$

where $(x_R, y_R, z_R)$ are coordinates of a point source with respect to a center of the hologram plane 0xy and $A_R$ is an amplitude at the point source k, l are integers, and $\Delta x$ and $\Delta y$ are sampling intervals in the hologram plane.

20. A method according to claims 1 or 2 wherein said digital reference wave is calculated using a mirror as a combination of Zernicke polynomials.

21. A method according to claims 1 or 2 wherein a phase of said digital reference wave is measured using an interferometric method with a mirror as a reference object.

22. A method according to claims 1 or 2 wherein said reconstruction distance is adjusted in order to fit approximately distance or a length of an optical path between the specimen and a plane where the hologram is created.

23. A method according to claims 1 or 2 wherein, if said object wave is provided by magnification or demagnification optics, said reconstruction distance is adjusted in order to fit approximately a distance between the image of the specimen and a plane where the hologram is created.

24. A method according to claims 1 or 2 wherein, if said object wave is provided by magnification or demagnification optics, the phase aberration appears in the observation plane and, as a consequence, said digital reconstructed wavefront in the observation plane is corrected in order to allow a corrected reconstruction of said quantitative phase contrast image of the specimen.

25. A method according to claims 1 or 2 wherein said analytical expression of the phase aberration is a two-dimensional function of complex numbers defined in such a way that said digital phase mask closely matches the complex conjugate of the phase aberration function in the observation plane.

26. A method according to claims 1 or 2 wherein said aberration correction parameters are parameters which are involved in the analytical expression of the phase aberration with the aberration correction parameters being adjusted in such a way that multiplication of said digital reconstructed wavefront in the observation plane by said digital phase mask corrects approximately the phase aberration in the observation plane.

27. A method according to claims 1 or 2 wherein, if said object wave is provided by a single spherical lens as magnification or demagnification optics, said phase aberration $C(m\Delta\xi, n\Delta\eta)$ can be computed using the following expression:

$$C(m\Delta\xi, n\Delta\eta) = \exp\left\{\frac{i\pi}{\lambda D}((m\Delta\xi)^2 + (n\Delta\eta)^2)\right\},$$

where λ is a wavelength of the illumination source, $\Delta\xi$ and $\Delta\eta$ are sampling intervals in the observation plane m,n are integers, D is an aberration correction parameter which depends on a specimen-lens distance $d_o$ and on a lens-image distance $d_i$ $$\frac{1}{D} = \frac{1}{d_i}\left(1 - \frac{d_o}{d_i}\right).$$

28. A method according to claims 1 or 2 wherein said phase aberration is calculated using a combination of Zernicke polynomials.

29. A method according to claims 1 or 2 wherein said phase aberration is measured using an interferometric method with a mirror as a reference object.

30. A method according to claims 1 or 2 wherein said steps j), k) and l) are suppressed if appear in the observation plane.

31. A method according to claims 1 or 2 wherein said adjusting the reconstruction parameters is performed in such a way to reconstruct a real image of the specimen.

32. A method according to claims 1 or 2 wherein said adjusting the reconstruction parameters is performed in such a way to reconstruct a twin image of the specimen.

33. A method according to claims 1 or 2 wherein said adjusting the reconstruction parameters is performed by measuring associated physical quantities on a setup used for creating the hologram with said measuring associated physical quantities being performed by an apparatus which communicates with the computer.

34. A method according to claims 1 or 2 wherein said adjusting the reconstruction parameters is performed interactively by executing several times the numerical reconstruction of the digital hologram in a loop and modifying the reconstruction parameters in order to improve at least one of image quality and plausibility, wherein said loop is repeated until the reconstruction parameters have reached optimal values.

35. A method according to claims 1 or 2 wherein said adjusting the reconstruction parameters is performed by at least one of translating ad rotating at least one of the specimen and components of a set-up used for creation of the hologram.

36. A method according to claims 1 or 2 wherein said adjusting the reconstruction parameters is performed by analyzing the digital hologram with a numerical method.

37. A method according to claims 1 or 2 wherein a phase of said digital reference wave and phase of said digital phase mask are measured experimentally using the specimen of a known phase distribution and subtracting the known phase distribution of the specimen from a reconstructed phase distribution without correction of the phase aberration and without multiplication by the digital reference wave.

38. A method according to claims 1 or 2 wherein said amplitude contrast image and said quantitative phase contrast image are reconstructed simultaneously and are two different representations of the specimen at a same instant.

39. A method according to claims 1 or 2 wherein the quantitative phase contrast image of the specimen is used for quantitative measurements of at least one of optical properties and structural information including, refractive index measurements or thickness measurements.

40. A method according to claims 1 or 2 wherein said quantitative phase contrast image is used for measurement of a topography of the specimen.

41. A method according to claims 1 or 2 wherein said quantitative phase contrast image is used for surface profilometry.

42. A method according to claim 1 wherein said steps e), f), g), j), k), l) and o) are suppressed if the quantitative phase contrast image of the specimen is not desired.

43. A method according to claim 2 wherein said steps g), h), i), j), k), l) and o) are suppressed if the quantitative phase contrast image of the specimen is not desired.

44. A method according to claim 1 or 2 wherein said image acquisition system provides real-time image acquisition and wherein the numerical reconstruction of the digital hologram is performed instantaneously after the real-time image acquisition in order to allow real-time amplitude and quantitative phase contrast imaging.

45. A method according to claim 1 or 2 wherein said illumination source is a low-coherence or a pulsed illumination source and wherein the hologram is created with a light that is reflected by a selected slice inside semi-transparent said specimen where a depth of the selected slice is modified and wherein said reference wave is provided by means which allow an adjustment of a length of a path of the reference wave.

46. A method according to claim 1 or 2 wherein said object wave and said reference wave have a same wavelength in order to perform a homodyne detection of the hologram.

47. A method according to claims 1 or 2 wherein at least one of said reference wave and said object wave are provided by means which modify at least one of a wavelength and an amplitude and a frequency and a polarization and a phase and an optical path length of said reference and said object waves.

48. A method according to claims 1 or 2 wherein at least one of said reference wave and said object wave are provided by means which produce different wavelengths or frequencies for the object wave and for the reference wave, in order to achieve heterodyne detection of the hologram.

49. A method according to claims 1 or 2 wherein said hologram is provided by a set-up designed to create an in-line or Gabor hologram.

50. A method for simultaneous amplitude and quantitative phase contrast imaging of a specimen by numerical reconstruction of a set of digital holograms of the specimen comprising the following steps:
   a) providing a set of holograms of the specimen using an illumination source;
   b) acquiring a set of images of the set of holograms by an image acquisition system;
   c) digitizing the set of images of the set of holograms by an image digitizer in order to produce the set of digital holograms;
   d) processing each digital hologram of the set of digital holograms following steps d) to o) of claims 1 or 2, in order to product a set of amplitude contrast images of the specimen and a set of quantitative phase contrast images of the specimen.

51. A method according to claim 50 wherein said set of holograms of the specimen recorded in a reflection geometry for different orientations of the specimen and wherein information content of reconstructed said amplitude contrast images and reconstructed said quantitative phase contrast images, corresponding to the different orientations of the specimen, is used in order to build a computed three dimensional replica of the specimen.

52. A method according to claim 51 wherein said specimen include several distinct objects located at different locations in a three dimensional volume.

53. A method according to claim 50 wherein said set of holograms of the specimen recorded in a transmission geometry for different orientations of the specimen and wherein information content of reconstructed said amplitude contrast images and reconstructed said quantitative phase contrast images corresponding to the different orientations of the specimen is used in order to build a three dimensional computed tomography of the specimen.

54. A method according to claim 50 wherein said set of holograms of the specimen are recorded for different wavelengths of the illumination source or with different illumination sources of different wavelengths and wherein information content of reconstructed said amplitude contrast images and reconstructed said quantitative phase contrast images corresponding to the different wavelengths are used for spectroscopic investigations of three-dimensional said specimen.

55. A method according to claim 50 wherein said set of holograms of the specimen are recorded for different wavelengths of the illumination source or with different illumination sources of different wavelengths and wherein data corresponding to different holograms are combined to yield a three-dimensional conformation of the specimen by computing a 3D Fourier transform or a combined 1D Fourier 2-D Fresnel transform of the set of holograms.

56. A method according to claim 50 wherein said specimen is semi-transparent and wherein said set of holograms of the specimen are recorded in a transmission geometry for different wavelengths of the illumination source or with different illumination sources of different wavelengths and wherein a model describing a behavior of a refractive index as a function of a wavelength is used in order to measure at least one of a three-dimensional distribution of the refractive index and a thickness of the specimen, on a basis of data corresponding to different holograms corresponding to different wavelengths.

57. A method according to claim 50 wherein said set of holograms of the specimen are recorded with different off-axis geometries to include different orientations of a mirror which reflects a reference wave whereby reconstructed images will appear in different locations of an observation plane and represent the specimen at different instants.

58. A method according to claim 50 wherein said set of holograms of the specimen are recorded with different polarization states of a reference wave, and wherein reconstructed images corresponding to the different polarization states of the reference wave are used to investigate birefringence or dichroism or scattering behavior of the specimen.

59. A method according to claim 50 wherein said set of holograms of the specimen are recorded at different instants and wherein reconstructed images corresponding to the different instants are used in order to do at least one of the following to build a computed video animation and monitor a deformation of the specimen and monitor a movement of the specimen and monitor a modification of optical properties of the specimen.

60. A method according to claim 59 wherein said set of holograms are recorded at the different instants with a same or with a different said specimen and wherein the reconstructed images corresponding to the different instants are used in order to build the computed video animation.

61. A method according to claim 59 wherein said specimen include several distinct objects located at different locations in a three dimensional volume.

62. A method according to claim 50 wherein said set of holograms of the specimen are recorded using several image acquisition systems and an appropriate set-up wherein corresponding reconstructed images represent the specimen with different direction of observation at different instants.

63. A method according to anyone of claims 1 or 2 wherein said specimen includes several distinct objects located at different locations in a three dimensional volume.

64. A method according to claims 1 or 2 wherein said hologram is created using a plurality of reference waves.

65. A method according to claims 1 or 2 wherein said hologram is created using one reference wave and a plurality of object waves.

66. A method according to claims 1 or 2 wherein said hologram is created using a plurality of reference waves and a plurality of object waves.

67. A method according to claims 1 or 2 wherein said hologram is created using two reference waves of crossed polarization and different directions of propagation and one object wave.

68. A method according to claims 1 or 2 wherein said hologram is created using one reference wave and two object waves of crossed polarization and different directions of propagation.

69. A method according to claims 1 or 2 wherein said hologram is created using two reference waves of crossed polarization and different directions of propagation and two object waves of crossed polarization and different directions of propagation.

70. A method according to claims 1 or 2 wherein a synchronized series of object waves interferes with a series of reference waves to form a single hologram, reconstructed amplitude and phase contrast images yielding an evolution in time of an object at different locations of the observation plane to allow for study of object changes under modification of an external parameter in a rapid time sequence.

71. A method according to claims 1 or 2 comprising an application of digital image processing methods before numerical reconstruction of the digital hologram wherein said digital image processing methods are applied, before said step e), to the digital hologram.

72. A method according to claims 1 or 2 comprising an application of digital image processing methods after numerical reconstruction of the digital hologram wherein said digital image processing methods are applied, after said step m), to the amplitude contrast image of the specimen.

73. A method according to claims 1 or 2 comprising an application of digital image processing which methods after numerical reconstruction of digital hologram wherein said digital image processing methods are applied, after said step n) to said quantitative phase contrast image of the specimen.

* * * * *